(12) United States Patent
Nakashima

(10) Patent No.: US 10,486,251 B2
(45) Date of Patent: Nov. 26, 2019

(54) MACHINING DEVICES

(71) Applicant: MAKITA CORPORATION, Anjo-shi, Aichi (JP)

(72) Inventor: Tatsuo Nakashima, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 183 days.

(21) Appl. No.: 15/486,575

(22) Filed: Apr. 13, 2017

(65) Prior Publication Data

US 2017/0326660 A1    Nov. 16, 2017

(30) Foreign Application Priority Data

May 16, 2016    (JP) .................................. 2016-097957
Mar. 14, 2017   (JP) .................................. 2017-048362

(51) Int. Cl.
*B23D 59/00*    (2006.01)
*B23D 45/16*    (2006.01)
*B27B 9/04*     (2006.01)

(52) U.S. Cl.
CPC .......... *B23D 59/002* (2013.01); *B23D 45/16* (2013.01); *B27B 9/04* (2013.01)

(58) Field of Classification Search
CPC .......... B27B 9/04; B23D 59/002; B23D 45/16
USPC .................................................. 30/374, 375
See application file for complete search history.

(56) References Cited

U.S. PATENT DOCUMENTS

| | | | | |
|---|---|---|---|---|
| 2,800,933 A | * | 7/1957 | Michael ............... | B23Q 9/0028 30/373 |
| 2,819,742 A | * | 1/1958 | Blachly ................. | B27G 19/08 30/373 |
| 3,087,519 A | * | 4/1963 | McCarty .............. | B23D 49/167 30/373 |
| 3,277,934 A | * | 10/1966 | Yelpo ....................... | B27B 9/00 30/376 |
| 3,707,768 A | * | 1/1973 | Spengler .............. | B23D 49/162 30/273 |
| 4,087,914 A | * | 5/1978 | Bates .................... | B23D 59/002 30/374 |
| 4,628,608 A | * | 12/1986 | Kuhlmann ........... | B23Q 9/0028 30/293 |
| 4,665,617 A | * | 5/1987 | Maier ................... | B23D 49/162 30/374 |

(Continued)

FOREIGN PATENT DOCUMENTS

JP    2001-315075 A    11/2001
JP    2005-349699 A    12/2005

(Continued)

*Primary Examiner* — Omar Flores Sanchez
(74) *Attorney, Agent, or Firm* — Oliff PLC

(57) ABSTRACT

A pressing member is rotatably supported by a fixing screw shaft via a ball bearing. The pressing member is made of synthetic resin and is larger in diameter compared to that of the fixing screw shaft. A connection bar is pressed by the pressing member by fastening the fixing screw shaft, and the position of the connection bar is thereby fixed. Because the pressing member has a large diameter, a dent is not generated on the connection bar. Furthermore, because the pressing member is not rotated in the fixed position, the position of the connection bar is not offset, enhancing the ability of fixing the connection bar with precise adjustment.

15 Claims, 19 Drawing Sheets

(56) References Cited

U.S. PATENT DOCUMENTS

| | | | | |
|---|---|---|---|---|
| 5,381,602 | A * | 1/1995 | Matzo | B27B 9/02 30/375 |
| 5,617,638 | A * | 4/1997 | Amano | B23D 49/167 30/375 |
| 6,269,543 | B1 * | 8/2001 | Ohkouchi | B23D 45/16 30/390 |
| 6,691,418 | B1 * | 2/2004 | Lewin | B27B 9/02 30/375 |
| 7,174,641 | B2 * | 2/2007 | Kondo | B27B 9/02 30/371 |
| 7,516,552 | B2 * | 4/2009 | Yoshida | B23D 47/02 30/371 |
| 7,610,839 | B1 * | 11/2009 | Bessette | B23Q 9/0014 30/373 |
| 7,950,156 | B2 * | 5/2011 | Nickels, Jr. | B27B 9/02 30/371 |
| 8,650,761 | B2 * | 2/2014 | Haas | B25H 1/0078 30/293 |
| 9,095,469 | B2 * | 8/2015 | Nayak | B23D 47/02 |
| 2003/0051592 | A1 * | 3/2003 | Molburg | B23Q 9/0042 83/745 |
| 2004/0168327 | A1 * | 9/2004 | Kondo | B27B 9/02 30/371 |
| 2005/0274028 | A1 | 12/2005 | Yoshida et al. | |
| 2005/0278959 | A1 | 12/2005 | Nishimiya et al. | |
| 2006/0042102 | A1 * | 3/2006 | Lukens | B27B 9/04 30/373 |
| 2006/0213067 | A1 * | 9/2006 | Yoshida | B23D 59/006 30/374 |
| 2007/0277389 | A1 * | 12/2007 | Baida | B23D 59/003 33/640 |
| 2009/0044677 | A1 * | 2/2009 | Wilson | B27B 9/04 83/824 |
| 2010/0192389 | A1 * | 8/2010 | Okada | B23D 47/12 30/374 |
| 2018/0056541 | A1 * | 3/2018 | Spitznagel | B27B 9/04 |

FOREIGN PATENT DOCUMENTS

| | | |
|---|---|---|
| JP | 2006-026886 A | 2/2006 |
| JP | 2006-116815 A | 5/2006 |
| JP | 2006-159786 A | 6/2006 |
| JP | 2006-289869 A | 10/2006 |
| JP | 2013-248740 A | 12/2013 |
| JP | 2015-136873 A | 7/2015 |

* cited by examiner

MACHINING DEVICES

CROSS-REFERENCE

This application claims priority to Japanese patent application serial number 2016-097957, filed on May 16, 2016, and to Japanese patent application serial number 2017-048362, filed on Mar. 14, 2017, where the contents of both are incorporated herein by reference in their entirety.

TECHNICAL FIELD

The present invention generally relates to a machining device and/or a machining apparatus/tool such as, for example, a portable cutting device, used for cutting a material to be cut (work piece), such as a wooden material, etc.

BACKGROUND ART

In some of the portable cutting devices known in the art, a user performs a cutting work of a material to be cut (work piece) by moving the cutting device placed on the material to be cut (work piece). These types of cutting devices may include a base that is brought into contact with an upper surface of the material to be cut (workpiece) and a cutting device main body that is supported above an upper surface of the base. The cutting device includes an electric motor and a rotary cuffing blade that can rotate by the electric motor as a driving source. The cutting blade protrudes in a downward direction from a lower surface of the base, i.e., from a contact surface of the base with respect to the material to be cut (work piece). By contacting the base to the upper surface of the material to be cut (work piece) and rotating the cutting blade protruding from the lower surface of the base and then moving the cutting device along the material to be cut (work piece), the user can cut the material.

Some cutting devices of this kind have been provided with a parallel guide ruler for precisely moving the cutting device in parallel with an edge of the material to be cut (work piece). The parallel guide ruler includes a guide ruler main body that is brought into contact with the edge of the material to be cut (work piece) and a connection bar that can support the guide main body at a fixed position in an adjustable manner. For example, Japanese Laid-Open Patent Publication No. 2006-459786 discloses a method for fixing the parallel guide ruler with respect to the base by pressing a tip of a fixing screw directly to the connection bar Japanese Laid-Open Patent Publication No. 2013-248740 discloses a method for preventing a dent on the connection bar by surface contacting a sheet metal support member, which is vertically displaceable, to the connection bar with the fixing screw pressed, whereby doing so the user can finely adjust the position of the parallel guide ruler with respect to the base.

However, the guide ruler fixing method disclosed in Japanese Laid-Open Patent Publication No. 2006-159786 may cause the following failures owing to the structure where the tip of the fixing screw presses the connection bar directly. That is, the connection bar might move in accordance with the rotation of the fixing screw because of friction between the fixing screw and the connection bar. In some cases, a dent on the connection bar made by the tip of the screw might offset a position of the connection bar when fixing the connection bar. Because of this configuration, it might be difficult to finely adjust the position of the guide ruler main body. In contrast, according to the guide ruler fixing structure disclosed in Japanese Laid-Open Patent Publication No. 2013-248740 in which the support member is brought into surface contact with the connection bar, the dent discussed above might not be made. However, there still remains a possibility for an offset of the connection bar to occur owing to the friction caused by the surface contact of the support member.

SUMMARY

Thus, as a result of the mentioned deficiencies in the art, there is a need in the art to both prevent dent generation by the tip of the screw when screw-fastening the connection bar with the fixing screw, and also to prevent generation of an offset of the connection bar owing to the friction caused by the surface contact of the support member, thereby enabling true fine adjustment by the user of the position of the parallel guide ruler with respect to the base.

In one exemplary embodiment of the present disclosure, a machining device including a cutting blade for cutting a work piece comprises a parallel guide ruler that is attached to the machining device, and the parallel guide ruler has a connection bar and is configured to guide the cutting blade of the machining device with respect to the work piece. The machining device also comprises a ruler-fixing device that includes an operation member that is rotatable. Furthermore, the connection bar is pressed by a motive force caused by rotation of the operation member such that a position of the parallel guide ruler is fixed, and a friction reduction member is disposed between the operation member and the connection bar.

According to the embodiment, friction of the operation member with respect to the connection bar can be reduced by the friction reduction member. As a result, damage such as a dent (scar) etc. generation on the connection bar can be prevented. Furthermore, a positional offset of the connection bar can also be prevented, and the parallel guide ruler can be finely adjusted in a correct manner. A rolling ball bearing such as a ball bearing, as well as a bearing made of synthetic resin with a low friction coefficient or a bearing such as a bearing metal made of oil-impregnated metal can be used as the friction reduction member. Furthermore, lubricant oil such as grease can be applied to the tip end of the operation member (a pressing member with respect to the connection bar) in order to reduce friction.

In another exemplary embodiment of the disclosure, the friction reduction member includes a pressing member that is rotatable with respect to the operation member, and the pressing member is configured to be brought into contact with the connection bar to press the connection bar.

According to such an embodiment, the pressing member that is rotated with respect to the operation member is brought into contact with the connection bar, and in this state of contact the connection bar is pressed by the motive force caused by rotation of the operation member. In the prior art, a tip end of the fixing screw directly presses the connection bar in order to fix the parallel guide ruler. In contrast, in the present embodiment, the connection bar can be fixed via the pressing member by indirectly applying the motive force caused by rotation of the operation member. As a result, unlike in the prior art, damage such as the dent (scar) generation may be prevented on the connection bar. Furthermore, since the pressing member as the friction reduction member is rotatably supported by the operation member, in a stage where the pressing member is pressed by the connection bar by rotation of the operation member, rotation of the pressing member is restricted. By virtue of the rotation of the pressing member being restricted, the positional offset of the connection bar is also restricted. As a result, the position of the parallel guide ruler can be finely adjusted in a correct manner.

In another exemplary embodiment of the disclosure, the pressing member is rotatably supported by the operation member via a ball bearing.

According to such an embodiment, the motive force in the rotation direction caused by rotation of the operation member is not transferred to the pressing member owing to the support of the rolling ball bearing. Because of this configuration, the pressing member is not rotated in a pressing state with respect to the connection bar. As a result, the positional offset of the connection bar does not occur, and the parallel guide ruler can be correctly positioned.

In another exemplary embodiment of the disclosure, friction between the pressing member and the connection bar is configured to be larger than that between the pressing member and the operation member.

According to such an embodiment, in a pressing state of the pressing member, rotation of the pressing member is restricted by friction received from the connection bar while the operation member is rotated. As a result, the positional offset of the connection bar is restricted.

In another exemplary embodiment of the disclosure, the pressing member is made of synthetic resin.

According to such an embodiment, damage such as the dent (scar) generation with respect to the parallel guide ruler can be reliably prevented.

In another exemplary embodiment of the disclosure, a machining device including a device main body with a cutting blade for cutting a work piece and a base that supports the device main body with respect to the work piece comprises a tool-fixing device for fixing an auxiliary tool to the base, where the tool-fixing device includes an operation member that is rotatable. Furthermore, the auxiliary tool includes a connection bar. The connection bar is pressed by a motive force caused by rotation of the operation member such that a position of the auxiliary tool is fixed to the base, and a friction reduction member is disposed between the operation member and the connection bar.

According to such an embodiment, friction of the operation member with respect to the connection bar is reduced by the friction reduction member. As a result, damage such as the dent (scar) generation is prevented on the connection bar. Furthermore, the positional offset of the connection bar is also prevented and thus the attaching position of the auxiliary tool with respect to the base can be finely adjusted in a correct manner. A rolling ball bearing such as a ball bearing, as well as a bearing made of synthetic resin with a low friction coefficient, or a bearing such as a bearing metal made of oil-impregnated metal, can be used as the friction reduction member. Furthermore, lubricant oil such as grease can be applied to the tip end of the operation member (a pressing member with respect to the connection bar) in order to reduce friction.

In another exemplary embodiment of the disclosure, long guide ruler adaptor is fixed to the base as the auxiliary tool.

According to such an embodiment, the above-discussed effect can be obtained by the tool-fixing device for fixing the long guide ruler adaptor. The long guide ruler adaptor is the auxiliary tool that is used when the long guide ruler is attached to the portable machining device, and the portable machining device can be guided along the long guide ruler via the auxiliary tool.

DETAILED DESCRIPTION

Figure 1:
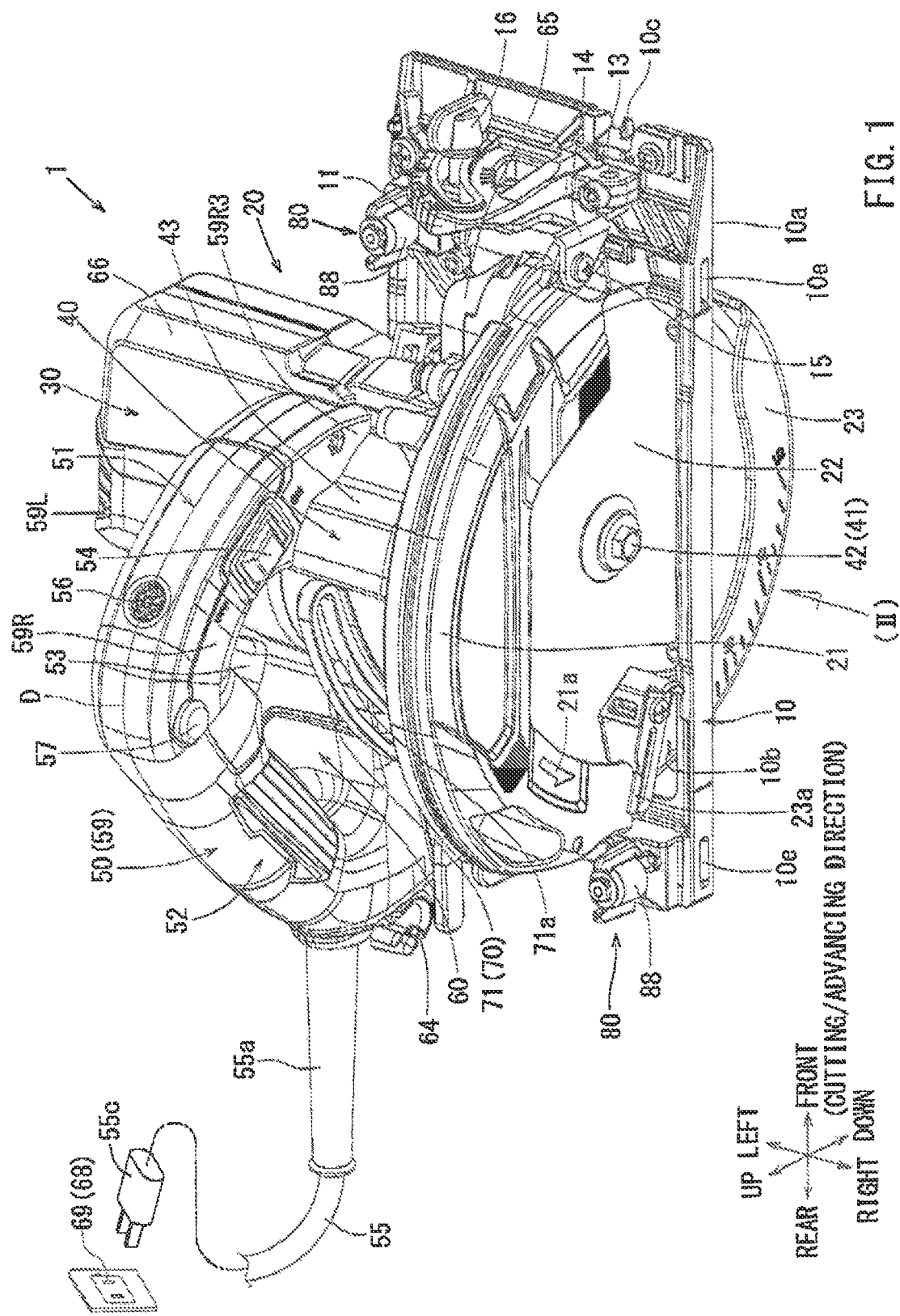
FIG. 1 is an overall perspective view of a cutting device according to an exemplary embodiment of the present disclosure.

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, these specific details refer to well-known structures, components and/or devices that are shown in block diagram form in order to avoid obscuring more significant aspects of the exemplary embodiments presented herein.

Representative, non-limiting embodiments according to the present disclosure will now be described with reference to FIGS. 1 to 21. In the following embodiments, a cutting device 1, which is referred to as a so-called portable circular saw (portable miter saw), is exemplified as a portable machine device. In reference to the front-rear direction with respect to members of the device in the configurations described below, a direction in which a cutting advances (a cutting/advancing direction) may be regarded as a front direction. Thus, a user may be positioned on a rear side of the cutting device 1. A left side and a right side with respect to a member and/or a configuration may be based on the left and right positions, respectively, of the user. The left side and the right side may also be referred to as a backside and a frontside, respectively.

As shown in FIGS. 1 to 4, the cutting device 1 may include a base 10 which is brought into contact with an upper surface of a work piece W, and a device main body 20 that is supported above an upper surface of the base 10. The base 10 may be formed in approximately a rectangular flat plate shape. A lower surface of the base 10 may be referred to as a contact surface 10a with which the work piece W is brought into contact. The base 10 may be provided with a window 10b through which a cutting blade 22 protrudes downward relative to the contact surface 10a. The window 10b may be formed in a rectangular shape extending in the front-rear direction along a right edge side of the base 10. The base 10 may be provided with a guide 10c in the front thereof and a guide 10d in the rear thereof, each of which is used for orienting the cutting blade 22 along a marking line that is made on the work piece W. A front support portion 11 and a rear support portion 12 may be provided on the upper surface of a front side and a rear side of the base 11, respectively. The front support portion 11 and the rear support portion 12 may be provided such that they are parallel to each other in an erected state (protruding at right angles to the upper surface of the base 10). The device main body 20 may be supported so as to be tiltable in the right and left direction via the front support portion 11 and the rear support portion 12.

Figure 3:
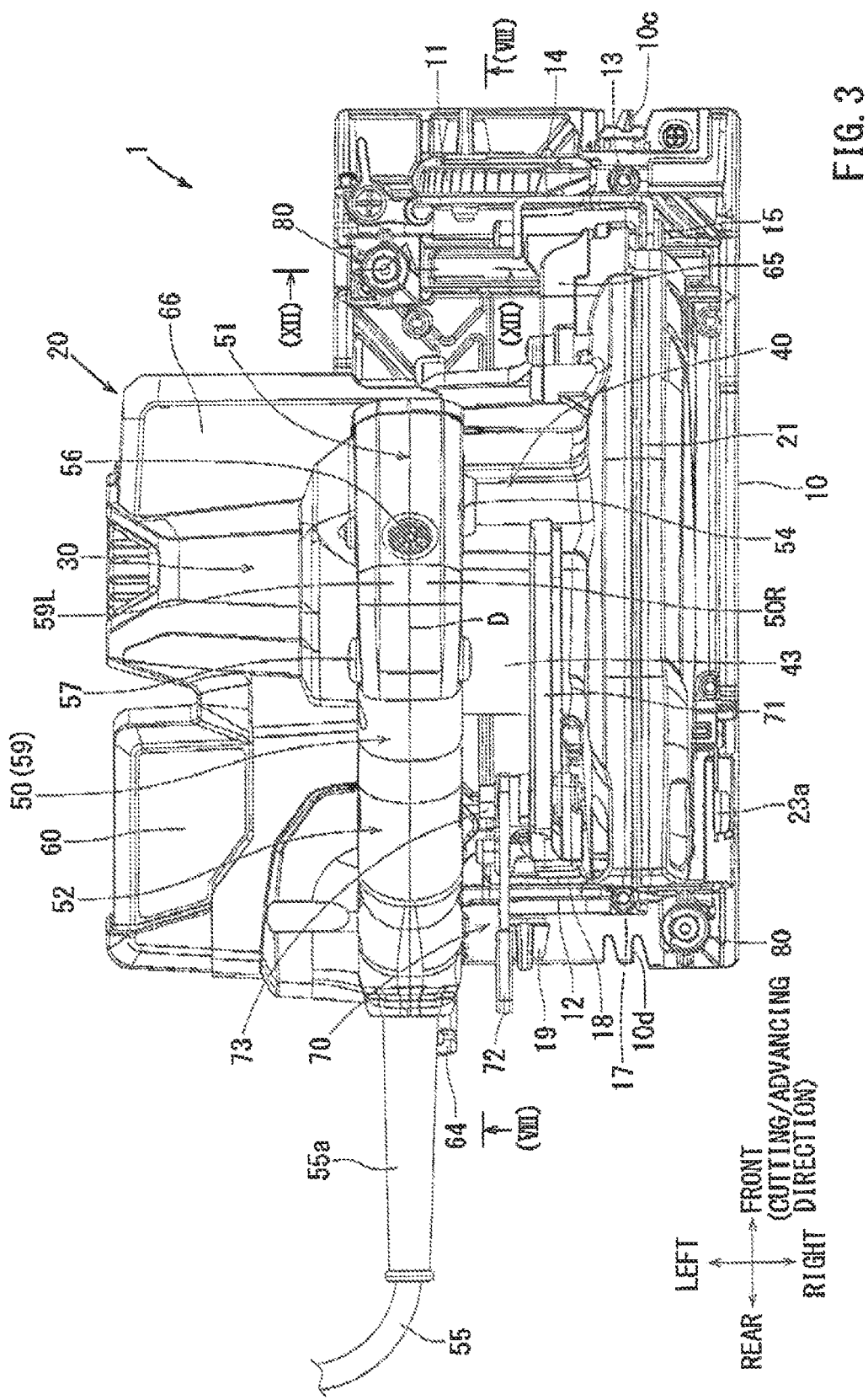
FIG. 3 is a plan view of the cutting device as seen from (a1) of FIG. 2.
Figure 4:
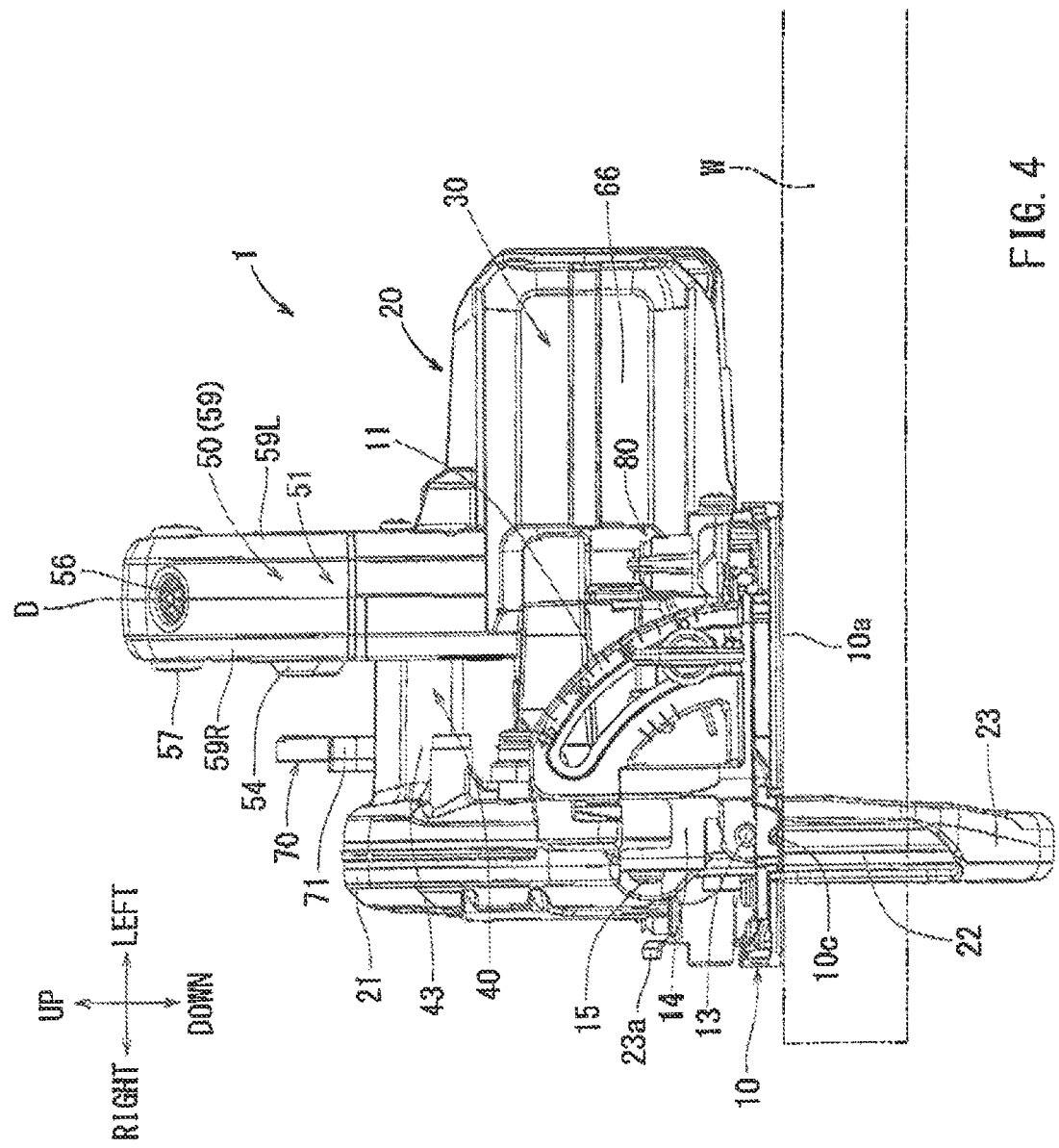
FIG. 4 is a front view of the cutting device as seen from (IV) of FIG. 2.

A tilting plate 14 may be supported in the front support portion 11 via a left/right tilting support shaft 13 so as to be tiltable in the right and left direction. A tilt position of the tilting plate 14 with respect to the front support portion 11 may be fixed by screw-fastening a knob screw 16. A front part of a cutting blade cover 21 of the device main body 20 may be supported by the right end portion of the tilting plate 14 via an up/down tilting support shaft 15. As shown in FIG. 3, a tilting plate 18 may be supported in the rear support portion 12 via a left/right tilting support shaft 17 so as to be tiltable in the right and Left direction. The left/right tilting support shaft 17 on the rear side and the left/right tilting support shaft 13 on the front side may be coaxially disposed in the rear-to-front direction. A tilt position of the tilting plate 18 with respect to the rear support portion 12 may be fixed by screw-fastening a knob screw 19. A rear part of the cutting blade cover 21 may be supported by the tilting plate 18 via a cutting depth adjustment mechanism 70. The cutting depth adjustment mechanism 70 will be described in detail (see infra). Loosening of the above discussed knob screws 16 and 19 may tilt the cutting main body 20 in the left and right direction around the left/right tilting support shafts 13 and 17. By tilting the device main body 20 in the left and right directions (mainly, in a direction in which an upper portion of the device main body 20 moves to the right side), a cutting angle of the cutting blade 22 with respect to the work piece W can be adjusted. In this way, a so-called oblique cutting can be performed.

The device main body 20 may include the rotary cutting blade 22, the cutting blade cover 21, where said cover 21 covers the periphery of mainly the upper side of the cutting blade 22, an electric motor 30 that serves as a driving source for rotating the cutting blade 22, a reduction gear 40 for reducing a rotation output of the electric motor 30, and a handle 50 that can be held by a user. Roughly the upper half circumference of the cutting blade 22 may be covered by the cutting blade cover 21. The cutting blade 22 may protrude downward from the lower surface of the base 10 via the window 10b of the base 10. A lower cutting blade 22 protruding below the lower surface of the base 10 may be covered by a movable cover 23. The movable cover 23 may be supported along the periphery of the cutting blade 22 so as to be opened and closed. The movable cover 23 may be spring-biased in a closing direction (in a counterclockwise direction in FIG. 2). As shown, in FIG. 2, the movable cover 23 may be opened in a direction in which a tip of the cutting blade 22 is exposed by being pushed by an end surface of the work piece W. An opening/closing lever 23a may be provided at the rear part of the movable cover 23. A user may hold and manually operate the opening/closing lever 23a to open and/or close the movable cover 23.

Figure 6:
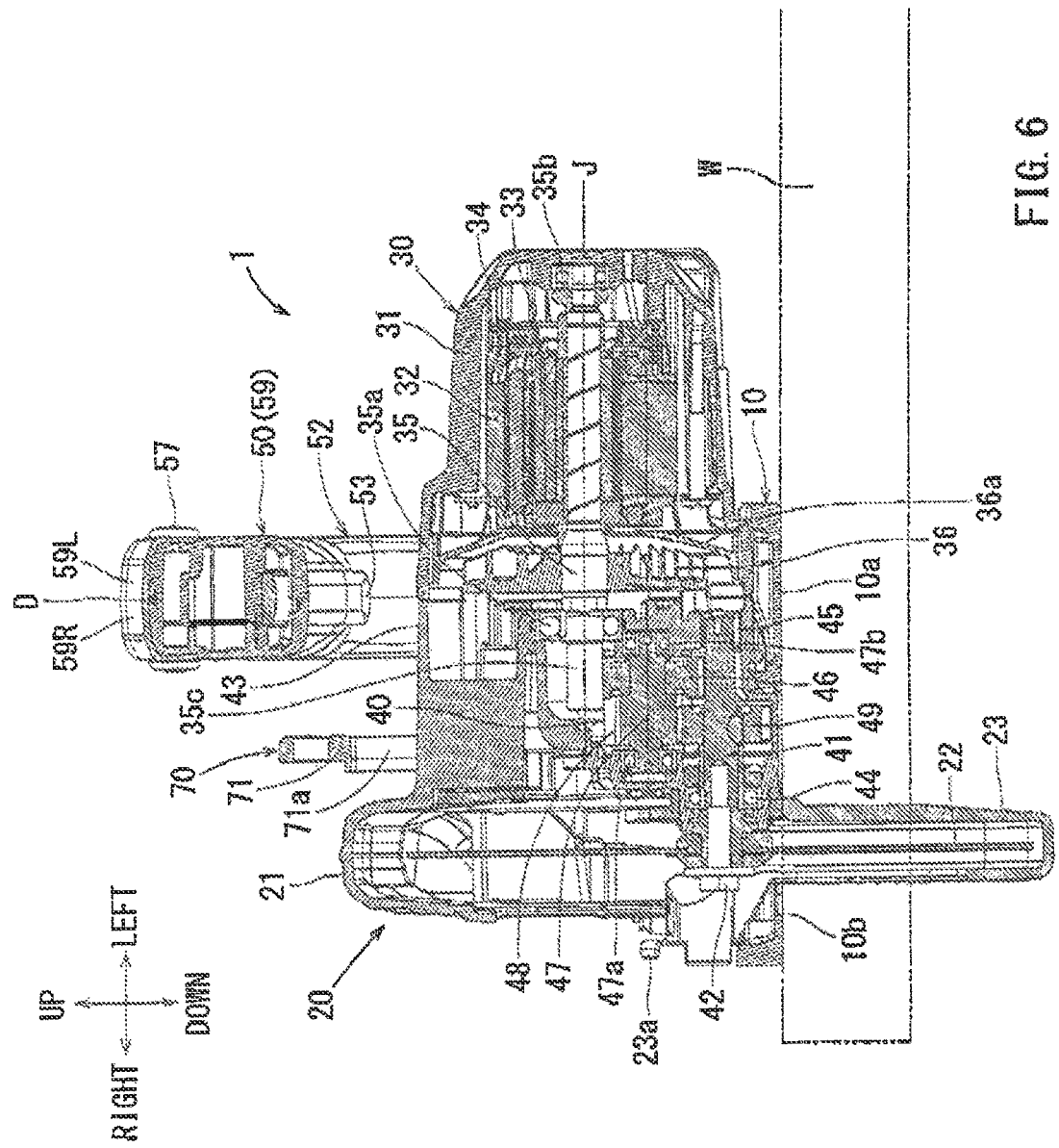
FIG. 6 is a cross-sectional view taken along line (VI)-(VI) of FIG. 2, showing the cutting device in a vertical cross section.

As shown in FIGS. 1 and 6, the electric motor 30 may be mechanically connected to the left side (backside) of the cutting blade cover 21 via the reduction gear 40. A brushless motor, which can be driven by a commercial AC power source 68 of 100V, may be used for the electric motor 30. As shown in FIG. 6, the electric motor 30 may include a stator 32 that is fixed to a motor case 31 and a rotor 33 that is rotatably supported in an inner circumference of the stator 32. An electric circuit board 34 (sensor circuit board 34), on which a magnetic sensor for detecting a rotation position of the rotor 33 is mounted, may be attached to the left side (backside) of the stator 32. A motor shaft 35 mechanically connected to the rotor 33 may be rotatably supported around a motor axis J via bearings 35a and 35b. The bearing 35a may be disposed on an output side of the motor shaft 35 and the bearing 35b on an anti-output side. The bearing 35a on the output side may be held in a gear case 43 and the bearing 35b on the anti-output side may be held in the motor case 31.

Figure 7:
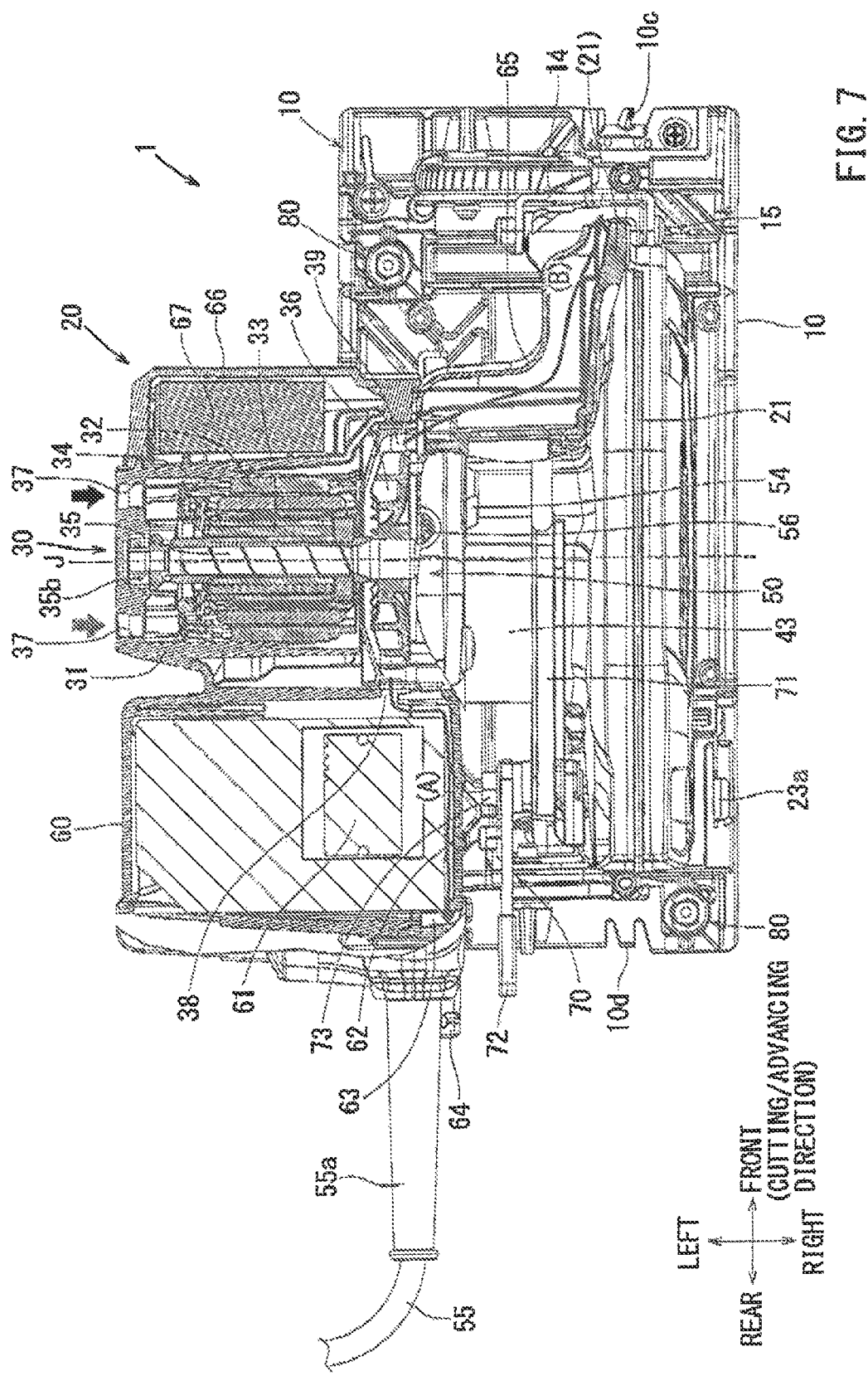
FIG. 7 is a partially cross-sectional plan view of the cutting device, briefly showing a cooling airflow.

A cooling fan 36 may be attached to the motor shaft 35. A baffle plate 36a may be disposed on the left side (backside) of the cooling fan 36 for effectively producing airflow. An opening of the motor case 31 may be covered by the baffle plate 36a. When the electric motor runs, the cooling fan 36 may rotate together with the motor shaft 35. As shown in FIG. 7, a plurality of intake windows 37 may be disposed on the left side (backside) of motor case 31. When the cooling fan 36 rotates, fresh outside air (motor cooling air) may be taken into the motor case 31 through the intake windows 37. The fresh outside air taken into the motor case 31 may cool the stator 32, the rotor 33 and the sensor circuit board 34 and may flow to the output side along the motor axis J.

As shown in FIG. 7, a ventilation hole 38 may be provided on the rear surface of the motor case 31. Furthermore, the ventilation hole 38 may be disposed on the lateral side of the cooling fan 36, lying radially outward from and parallel to motor axis J. A part of the fresh outside air (motor cooling air) that flows in via windows 37 and has cooled the interior of the motor case 31 may further flow into controller housing 60 through the ventilation hole 38. The controller housing 60 may comprise a shallow rectangular case, and may be integrally formed with the motor case 31 at the rear side thereof. As shown in FIGS. 3 and 7, the control housing 60 may largely protrude in the left direction in a similar manner as the motor case 31. A controller 61 for controlling the electric motor 30 may be housed in the controller housing 60. The controller 61 may be configured such that a control circuit board, molded with resin, is housed in the rectangular shallow case made of die-cast aluminum. As shown by a solid thick line arrow (A) in FIG. 7, the motor cooling air flown into the controller housing 60 may be discharged from an exhaust hole 63 through a ventilation passage 62 provided on the right side of the controller housing 60. The controller 61, which may comprise heat generating sources such as FETs (field effect transistors) and a diode bridge etc., may appropriately be cooled by the motor cooling air flown into the controller housing 60. The controller 61 may also comprise a rectifier circuit having the diode bridge for rectifying a current supplied from the power source, a control circuit having a microprocessor for, for example, transmitting a control signal based on position information about the rotor 33 detected by the sensor of the sensor circuit board 34, a driving circuit having FETs for switching current flown to the electric motor 30 based on the control signal from the control circuit. These electric components may be mounted on the controller 61. A smoothing circuit comprising an electrolytic capacitor 67 for smoothing a rectified current may not be mounted on the controller 61 but be housed in a capacitor case 66. The capacitor case 66 will be discussed (see infra).

On the front side of the motor case 31, another ventilation hole 39 may be provided on the lateral side of the cooling fan 36, also lying radially outward from and parallel to motor axis J. A duct 65 may be joined to the ventilation hole 39. The duct 65 may extend in the front direction along the left side (backside) of the cutting blade cover 21. The front end of the duct 65 may be proximal to a cutting position of the work piece W. As shown by a solid thick line arrow (B) in FIG. 7, a part of the fresh outside air (motor cooling air) that flows in via windows 37 and that has cooled the interior of the motor case 31 may further flow out to the guide 10c from the ventilation hole 39, via duct 65. Dust such as cutting dust and/or cutting powders accumulated in the vicinity of the guide 10c may thus be blown off by the motor cooling air flowing out of the duct 65 in the front direction. By blowing off the accumulated dust in the vicinity of the guide 10c, the visibility of the guide 10c can be improved and the cutting work can be accurately and rapidly performed, with a clear sightline. The cooling air, comprising fresh outside air (motor cooling air) that flows in via windows 37 and that has cooled the interior of the motor case 31, that does not flow to the ventilation holes 38 and 39, may flow to the cutting blade cover 21 through the interior of the gear case 43. By the movement of this portion of the cooling air, flowing to the cutting blade cover 21, dust such as the cutting dust and cutting powders generated in the cutting position may be blown off.

Figure 2:
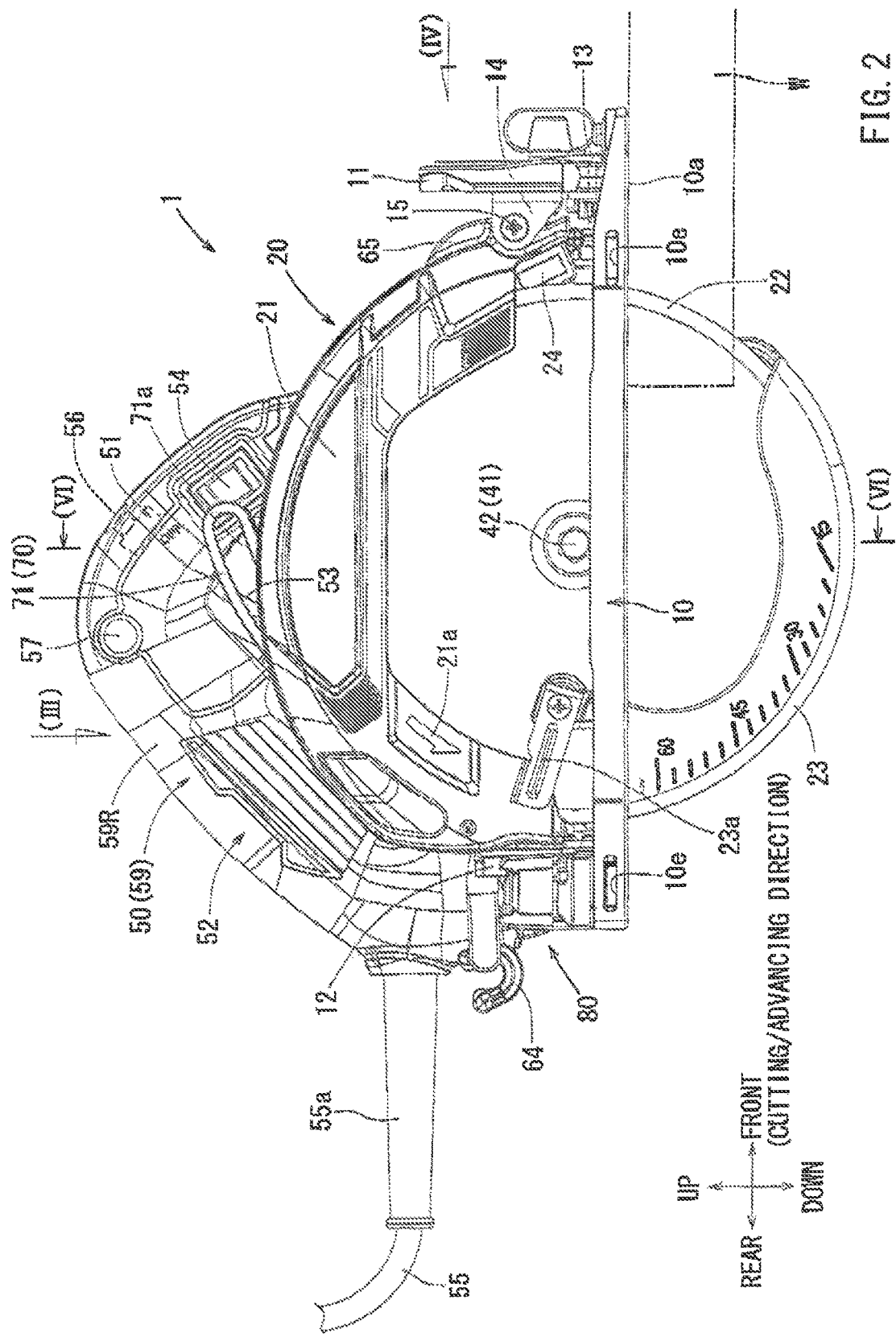
FIG. 2 is a right side view of the cutting device as seen from (II) of FIG. 1.

As shown in FIGS. 1 and 2, an arrow 21a that shows a rotation direction of the cutting blade 22 may be marked on the right side (frontside) of the cutting blade cover 21. As indicated by the arrow 21a in FIG. 2, the cutting blade 22 may rotate in a counterclockwise direction. Because of this indicated rotation direction, dust such as the cutting powders in the cutting position may fly upwards due to the force of the rotating cutting blade 22. Consequently, the dust is blown off from the cutting position into the cutting blade cover 21 due to flying upwards because of the indicated rotation direction, and it may be accumulated on the rear side of the interior of the cutting blade cover 21 by the rotating force of the cutting blade 22.

The rotation output of the electric motor 30 may be reduced via the reduction gear 40 and then transmitted to a spindle 41. As shown in FIG. 6, a drive gear 35c that is provided at a tip end of the motor shaft 35 may be engaged with a first driven gear 46. The first driven gear 46 may be fixed to an intermediate shaft 47. The intermediate shaft 47 may be disposed on the rear side of and below the motor shaft 35, and may be rotatably supported by the gear case 43 via two bearings 47a, 47b disposed on the output side and anti-output side, respectively, along a right-to-left direction parallel to the motor axis J. A second driven gear 48 may be integrally formed with the intermediate shaft 47. The second driven gear 48 may be engaged with the third driven gear 49. The third driven gear 49 may be fixed to the spindle 41.

The rotation output of the electric motor 30 may be reduced in two stages, i.e. via the engagement of the drive gear 35c with the first driven gear 46 and then further via the engagement of the second driven gear 48 with the third driven gear 49. The reduced rotation output of the electric motor 30 may be transmitted to the spindle 41. The spindle 41 may protrude rightwards to the interior of the cutting blade cover 21. The circular cutting blade 22 may be attached to a tip, end of the spindle 41 that protrudes to the interior of the cutting blade cover 21. The cutting blade 22 may be fixed to the spindle 41 by a cutting blade fixing screw 42 that is screw-fastened to the tip surface of the spindle 41. The spindle 41 may be disposed on the front side of and below the intermediate shaft 47, and may be rotatably supported by the gear case 43 via two hearings 44, 45 disposed on the output side and anti-output side, respectively, along the direction of the motor axis J.

As shown in FIG. 1, the handle 50 may be formed in a loop shape (in a roughly upside-down V shape) straddling an upper part of the electric motor 30 as well as an upper surface of the controller housing 60. The handle 50 may be disposed about the position demarcating the center of gravity of the cutting device 1 with respect to the left-right direction of the cutting device 1 (in the direction of the motor axis J of the electric motor 30). Because of this configuration, the center of gravity of the cutting device 1 may be positioned below the handle 50 and thus the user can easily carry the cutting device 1 holding the handle, which would maintain the device in a well-balanced manner in the left-right direction.

The handle 50 may be formed in the upside-down V shape having an erection portion 51 and a grip 52. The erection portion 51 may be formed so as to rise upward in the vicinity of the joint part formed by the electric motor 30 and the reduction gear 40. The grip 52 may be formed so as to be tilted in a rearward direction from the upper part of the erection portion 51. In other words, the erection portion 51 may be provided so as to be tilted in the forward direction descending from a top of the upside-down V shape, and the grip 52 may be provided so as to be tilted in the rearward direction descending from the top of the upside-down V shape. The user may operate (use) the cutting device 1 holding the grip 52 that descends to the rear side (the user side). The rear part of the grip 52 may be joined to the upper surface of the controller housing 60. In the explanation below, the controller housing 60 may be considered as a part of the handle 50 when necessary. In this case, the handle 50 may comprise the erection portion 51, the grip 52 and the controller housing 60. Furthermore, the handle 50 may in the loop shape straddle the upper surface of the electric motor 30 as well as the rear surface thereof.

Figure 19:
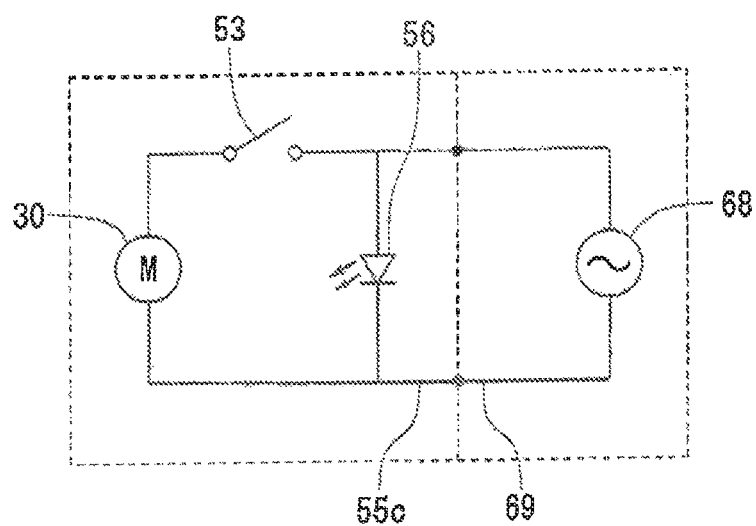
FIG. 19 is a schematic circuit diagram of the cutting device.

A power cord 55 may be drawn from the rear part of the grip 52. In more detail, the power cord 55 may be inserted through a rubber protective tube 55*a* that is attached to the rear part of the grip 52. As shown in FIG. 19, when a plug 55*c* of the power cord 55 is connected to a power outlet 69 of AC 100V, the electric motor 30 may be powered from a AC power supply 68 and the cutting device 1 may be in a starting possible state. In this specification, a state where the plug 55*c* of the power cord 55 is inserted and mechanically connected to the power outlet 69 (or in a state where a battery pack is mechanically connected to a battery attachment portion of the cutting device 1, where a DC power source can be used), or in other words, in a state where the power source is connected to a mains circuit (a circuit that connects the power source and the electric motor 30) and current can flow in the main circuit by operating a power source operation member (power switch) 53, such a state may be referred to as a "power source connecting state". In the power source connecting state, a start operation of the power source operation member (power switch) 53 may power the mains circuit (current may flow in the mains circuit), the electric motor 30 may run, and consequently the cutting device 1 may run.

As shown in FIG. 1, a power indicator 56 for indicating the above-discussed power source connecting state may be provided at the upper front surface of the erection portion 51. As shown in FIG. 19, when the plug 55*c* of the power cord 55 is inserted and mechanically connected to the power outlet 69, the power indicator 56 may be turned on even if the power switch 53 is not switched on. In this way, the power indicator 56 of the present embodiment may have a function of indicating a connecting state of the power cord 55 with respect to the power outlet 69. In addition to this function, the power indicator 56 may have a function of indicating that the cutting device 1 is prevented from restarting, or indicating that the electric motor 30 is in an overloaded state or a temperature of the electric motor 30 is abnormal, etc. In the present embodiment, LEDs eight emitting diode) may be used as a light source in the power indicator 56. By modulating the colors of the LEDs, switching between a turned-on state and a blinking (blinking on and off) state, or changing a blinking speed etc., the above-discussed functions may be visually indicated.

In a prior art such as, for example, Japanese Laid-Open Patent Application No. 2005-349699, a power indicator that indicates the power source connecting state is disposed on the cutting blade cover 21 at a lateral part of the handle. However, in a case where the handle can be disposed close to the cutting blade cover by using a brushless motor as the electric motor 30 that is compact with regard to a length direction of the cutting device, a problem of deteriorating visibility of the power indicator may occur. In contrast, the power indicator 56 of the present embodiment may be provided not on the lateral side of the handle 50 but rather on the front side of the handle 50 that the user holds and on the front surface of the erection portion 51 such that the power indicator 56 can be directly seen from above. Because of this configuration, in the present embodiment, the power indicator 56 can be clearly seen not only from lateral point of view but also from above with the handle 50 disposed close to the cutting blade cover 21.

Further, an illumination switch 54 may be provided on the right side of the erection portion 51. As shown in FIG. 2, an illumination device 24 may be provided on the front end of the right side (backside) of the cutting blade cover 21. When the illumination switch 54 is turned on, the illumination device 24 may concomitantly be turned on, which illuminates the cutting position, ensuring that the cutting work in a dark place can be of performed.

Figure 5:
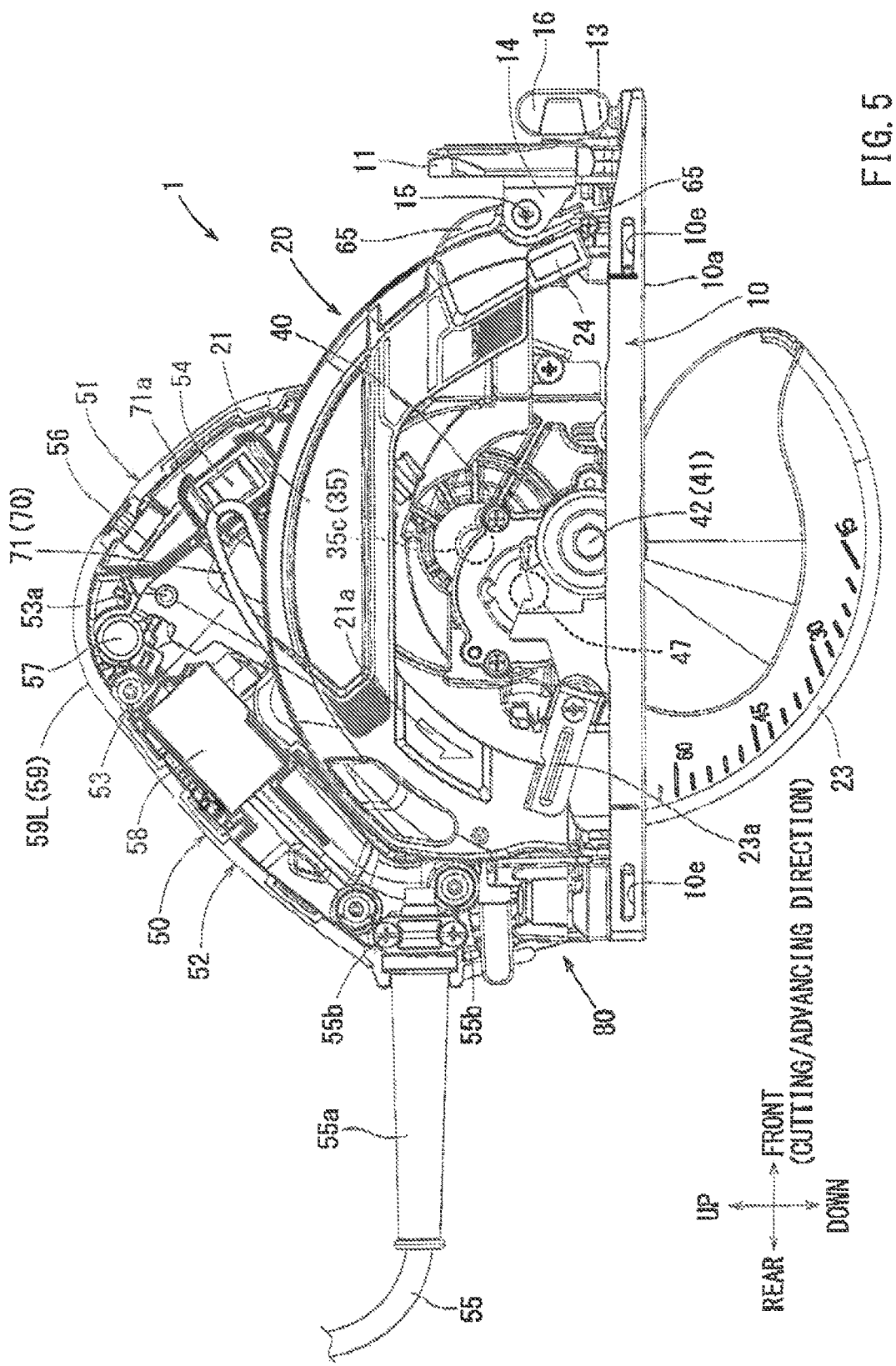
FIG. 5 is a right side view of the cutting device with its cutting blade removed.

A trigger-type power switch 53, which may be pulled upward by a fingertip of the user's hand holding the grip, is provided on the inner periphery (on the lower side) of the handle 50, proximal to the lower surface of the grip 52. As shown in FIG. 5, the power switch 53 may be supported so as to be movable obliquely upward and downward via a support shaft 53*a*. When the power switch 53 is pulled upward while the power indicator 56 is in a turned-on state (in the power source connecting state), a switch main body 58 that is housed in the grip 52 may be switched on. When the switch main body 58 is switched on, the electric motor 30 may run and the cutting blade 22 may rotate. When the pulling operation is released, the power switch 53 may be returned to an off position (an original position) by a biasing force of a compression spring 53*b* (refer to FIGS. 9 and 10). When the power switch 53 is returned to the off position, the switch main body 58 may be switched off and the electric motor 30 may stop.

A lock-on button 57 may be provided above the power switch 53. The lock-on button 57 may be provided on both sides of the handle 50. When the lock-on button 57 is pressed with the power switch 53 pulled upward, the electric motor 30 may be locked in a continuously running state. In this running state, the user does not need to pull the power switch 53 continuously for the motor to continue to run. Thus, the user can easily perform a cutting work for a long duration of time without pulling the power switch 53, which can improve operability in this respect. The lock-on state may be configured to be released by the user pulling the power switch 53 upward again.

Even in the lock-on state, if a power breakdown occurs or the plug 55*c* of the power cord 55 is unexpectedly pulled out of the power outlet 69, then the power supply to the device is interrupted and accordingly the electric motor 30 may stop. In a case where subsequently, the power supply is restored or the plug 55*c* of the power cord 55 is inserted (connected) again to the power outlet 69, without the previous lock-on state being released, a power control may be configured such that the electric motor 30 does not run and the cutting device 1 is prevented from unexpectedly restarting. The restart prevention state of the power supply can be indicated by the power indicator 56, for example, where the LEDs of the power indicator 56 turn on and off, displaying red light when on. This restart prevention state can be released, for example, by pulling the power switch 53 upward. After the restart prevention state is released, another subsequent upward pulling operation of the power switch 53 by the user may run the electric motor 30.

As shown in FIGS. 1, 3, 4 and 6, a handle cover 59 forming an outer shell of the handle 50 may have a half-split structure in which a left half-split housing 59L and a right half-split housing 59R are mated with each other when viewed in the left-to-right direction, which is a direction perpendicular to the operation direction of the power switch 53 (in the front-to-rear direction). In FIGS. 1, 3, 4 and 6, a symbol D is given to a mating surface where the left half-split housing 59L and the right half-split housing 59R mate with each other.

Figure 10:
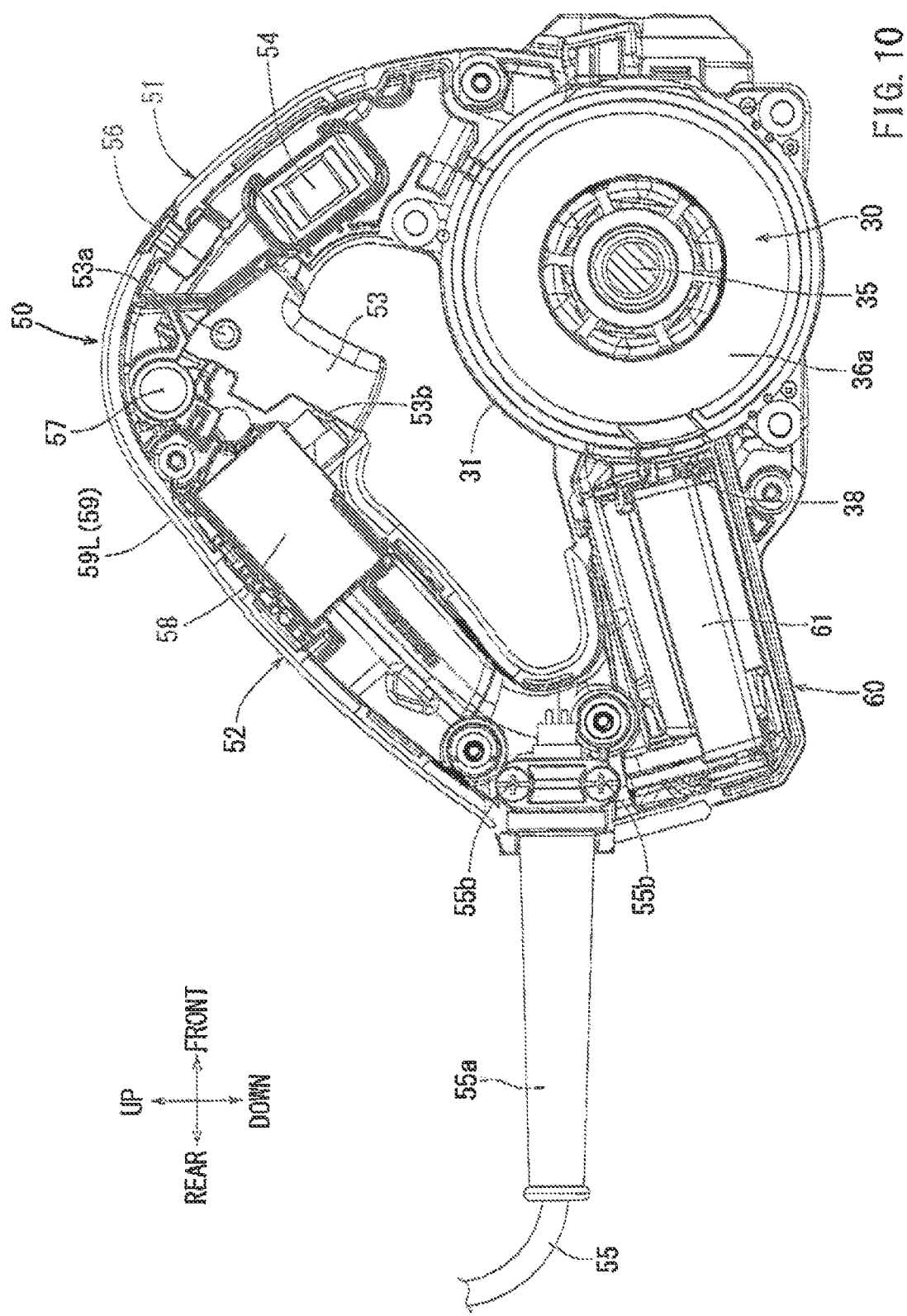
FIG. 10 is a right side view of the handle as seen from the same direction as from (VIII)-(VIII) of FIG. 3 with all division parts of the housing cover (a right half-split housing of the handle) being removed from a left half-split housing of the handle.

As shown in FIG. 10, the left half-split housing 59l, may straddle the motor case 31 as well as the integrally formed controller housing 60. As shown in FIG. 10, the power switch 53, the illumination switch 54, the lock-on button 57 and the switch main body 58 may be attached to the left half-split housing 59L. Furthermore, the protective tubes 55a through which the power cord 55 is passed may be screw-fastened by the two fixing screws 55b at the rear part of the left half-split housing 59L.

Figure 8:
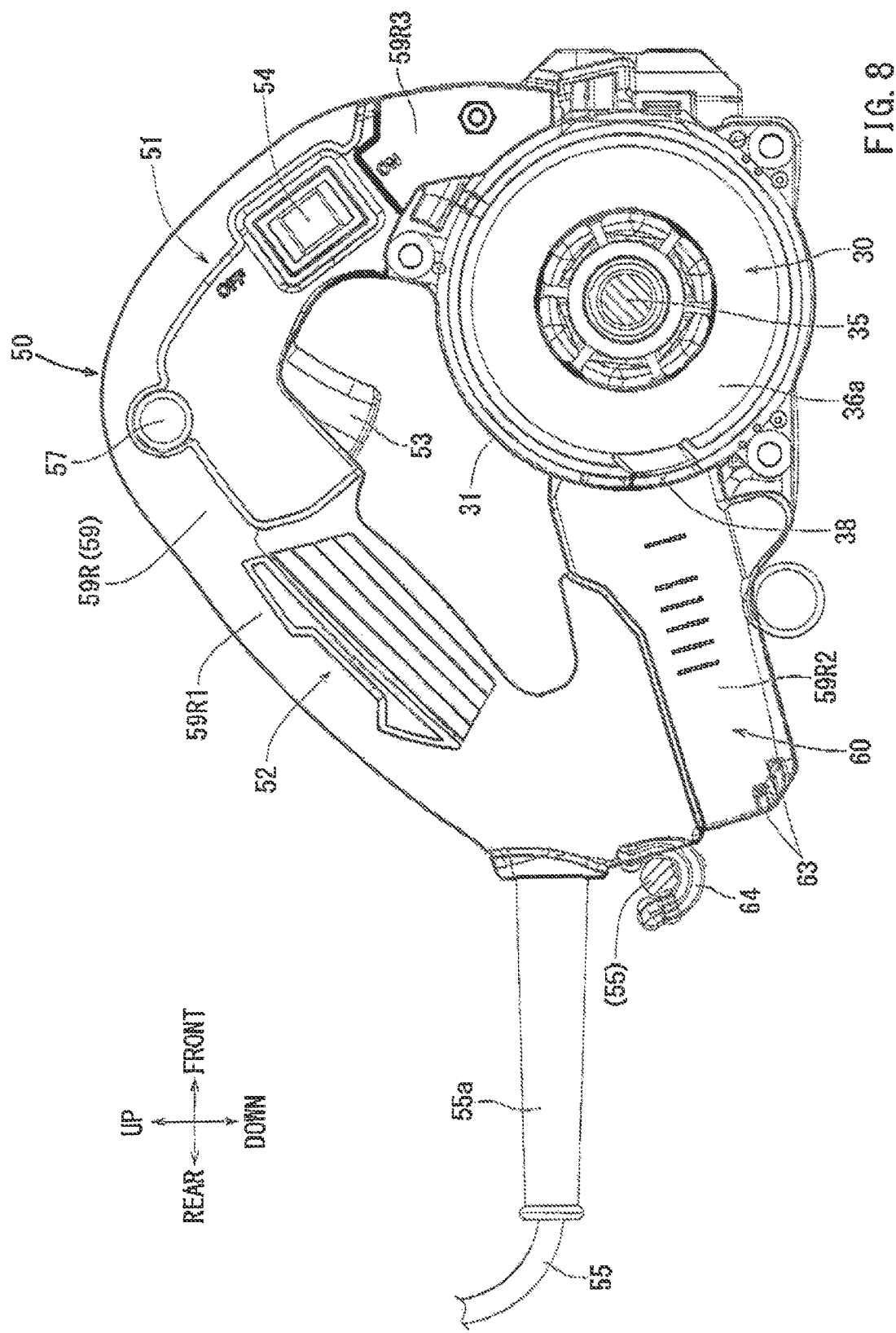
FIG. 8 is a right side view of a handle as seen from (VIII)-(VIII) of FIG. 3 with all division parts of a housing cover of the handle being attached.

The right half-split housing 59R may be screw-fastened to the left half-split housing 59L. As shown in FIG. 8, the right half-split housing 59R may be further split into three parts: 59R1, 59R2 and 59R3. The part 59R1 may extend from the erection portion 51 to the upper and front end of the grip 52. The part 59R2 may correspond to the right side of the controller housing 60. The part 59R3 may correspond to a part below the erection portion 51. An entire outer surface of the first part 59R1 may be covered with an elastomer resin layer for the purpose of impulse/shock absorption and prevention of slipping. In the present embodiment, the parts, i.e., the first part 59R1, the second part 59R2 and the third part 59R3, may be configured such that the elastomer resin layer borders the second part 59R2 and the third part 59R3. In other words, the second division part 59R2 and the third division part 59R3 may correspond to the areas of 59R that are not covered with the easterner resin layer. The above-discussed exhaust hole 63 may be disposed at the rear of the second part 59R2. The first to third parts 59R1, 59R2 and 59R3 may be separately) screw-fastened to the left-half-split housing 59L. Because of this configuration, the first to third parts 59R1, 59R2 and 59R3, respectively, may each be separately detached from the left half-split housing 59L by removing the corresponding screws. In FIG. 8, the first to third parts 59R1, 59R2 and 59R3 are each shown in thick solid lines.

Figure 9:
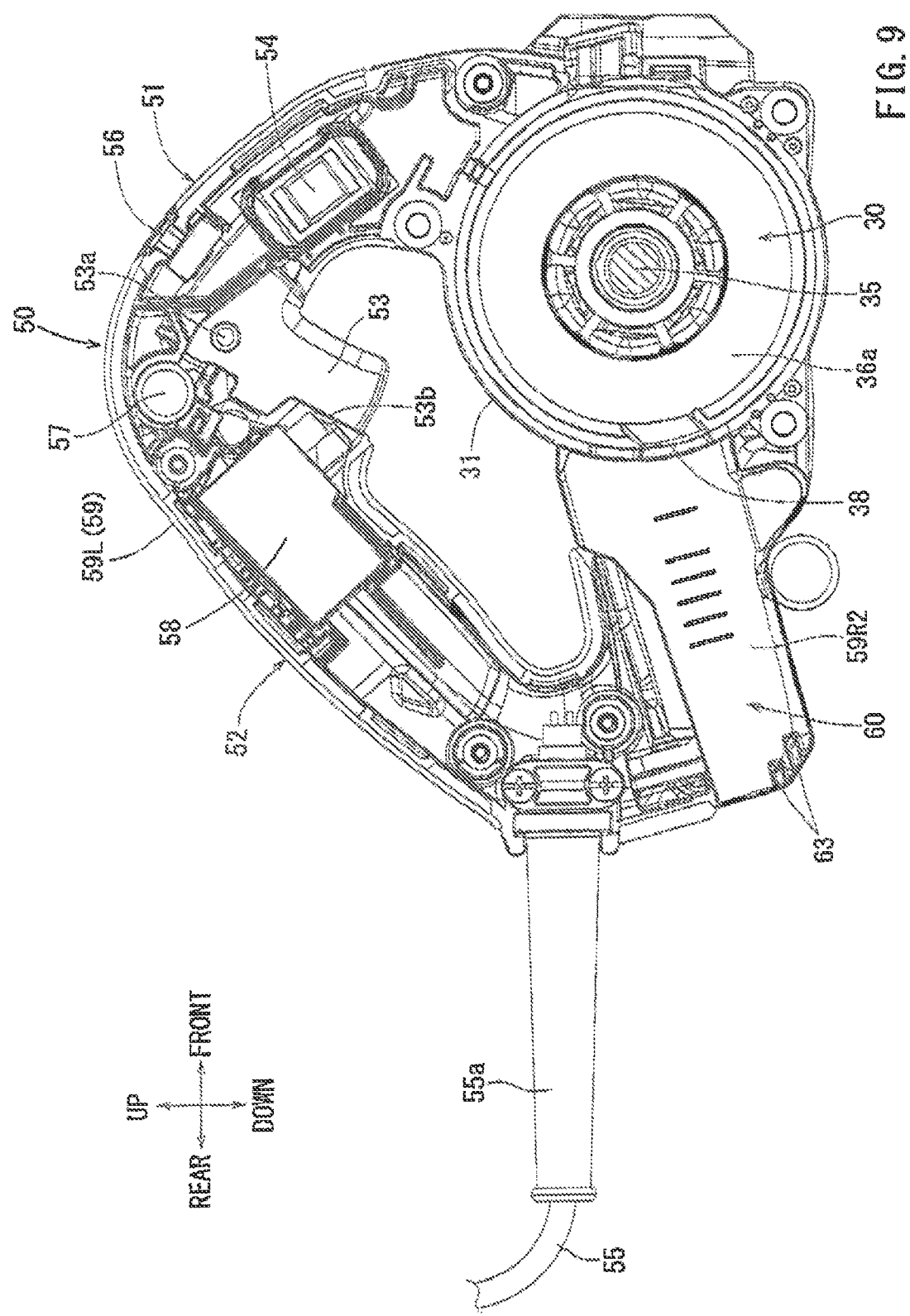
FIG. 9 is a right side view of the handle as seen from the same direction as from (VIII)-(VIII) of FIG. 3 with the first and third division parts of the housing cover being removed.

FIG. 8 shows where the first to third parts 59R1, 59R2 and 59R3 are attached to the left half-split housing 59L. FIG. 9 shows where the Ent part 59R1 and the third part 59R3 are detached from the left half-split housing 59L with the second part 59R2 attached. FIG. 10 shows where the first to third parts 59R1, 59R2 and 59R3 (forming an overall structure of the right half-split housing 59R) are detached from the left half-split housing 59L. In FIG. 10, all members such as the illumination switch 54, the power switch 53, the switch main body 58, a holding part of the power cord 55, and the controller 61 etc. may be exposed to the outside.

In a state where only the first part 59R1 is detached from the left half-split housing 59L with the second and third division part 59R2, 59R3 attached, though this is not shown in the figures, in this case the illumination switch 54, the power switch 53 and the switch main body 58 etc, may be exposed to the outside for inspection and/or replacement. Furthermore, in the state where only the first part 59R1 is detached from 59L, the power cord 55 can also be inspected or replaced. In this way, when the above-discussed components are inspected or replaced, only the first part 59R1 is required to be detached from the left half-split housing 59L while the second and third parts 59R2, 59R3 can remain attached. Because of this configuration, even if the handle 50 is disposed close to the cutting blade cover 21 and a (working) space between the two components is small, the inspection work and the replacement work can easily be performed compared to a case where the whole of the right half-split housing 59L (corresponding to ail three parts 59R1, 59R2, and 59R3 in this invention) needs to be detached. As a result, the maintainability of the cutting device 1 is improved by the present invention.

Furthermore, though not shown in the figures, when the motor case 31 is separated from the cutting blade cover 21 and the second part 59R2 is moved so as not to interfere with the cutting depth adjustment mechanism 70, the controller 61 may be exposed to the outside for inspection and/or replacement by removing only the second part 59R2 with the first and third parts 59R1, 59R3 remaining attached. Furthermore, electric wirings and connectors between the illumination switch 54 and the illumination device 24 may be exposed to the outside for inspection and/or replacement by removing the third part 59R3 while the first and second parts remain attached. In the above-discussed cases, only the appropriate corresponding necessary part(s), for example only the first part 59R1 in the first case, is (are) required to be detached from the left half-split housing 59L for inspection and/or replacement, while the remaining parts may remain attached to 59L. Thus, compared with a case where the whole of the right half-split housing 59R (corresponding to parts 59R1, 59R2, and 59R3 in this invention) has to be removed, in this invention through the above-described paradigms the inspection and replacement work can be easily and efficiently performed in a small space.

As shown in FIGS. 1 to 3, a cord hook 64 for fastening the power cord 55 may be provided at the rear part of the handle 50, in more detail, at the rear part of the first part 59R1. By fastening the power cord 55 to the cord hook 64, a pulling direction of the power cord 55 may be changed from the rear to the lateral direction. If the pulling direction of the power cord 55 is changed to the lateral direction, the power cord 55 does not interfere with the cutting work, which enables the user to easily and efficiently perform the cutting work. The surface of the cord hook 64 may be covered with the elastomer resin layer. Slippage of the power cord 55 within the cord hook 64 may be prevented by the elastomer resin layer. Furthermore, by fastening the power cord 55 in the cord hook 64, a base end of the power cord 55 is not be forced to bend, which also prevents disconnection of power lines.

As shown in FIGS. 1, 3, 4 and 7, a capacitor case 66 may be attached to the front surface of the motor case 31. A large-sized electrolytic capacitor 67, as shown in FIG. 7, may be housed in the capacitor case 66. By disposing the electrolytic capacitor 67 separately from the controller 61, the compactness of the controller 61 and eventually the controller housing 60 can be improved mainly in the height (up-to-down) direction.

The above-discussed cutting depth adjustment mechanism 70 may be disposed between the base 10 and the device main body 20. The cutting depth adjustment mechanism 70 has a function of adjusting the cutting depth of the cutting blade 22 with respect to the work piece W by varying a protruding amount of the cutting blade 22 protruding downward from the lower surface of the base 10. As shown in FIG. 3, the cutting depth adjustment mechanism 70 may be disposed between the tilting plate 18 and the cutting blade cover 21 in the right-to-left direction.

The cutting depth adjustment mechanism 70 includes an arc-shaped depth guide 71 that is supported above the rear part of the base 10. The depth guide 71 is supported by the tilting plate 18 so as to be tiltable in the front and rear direction. As shown in FIGS. 5 and 6, the depth guide 71 may be provided with an arc-shaped guide groove hole 71a. A fixing screw shaft 73 may be inserted through the guide groove hole 71a. As shown in FIG. 7, the fixing screw shaft 73 may be screw-fastened to the left surface (back surface) of the cutting blade cover 21. A rotatable fixing lever 72 serving as an operation portion may be attached to the fixing screw shaft 73. When the fixing screw shaft 73 is loosened by rotating (operating) the fixing lever 72, the device main body 20 may be moved vertically (may be tiltable in the up/down direction) around the up/down tilting support shaft 15. By tilting the device main body 20 in the up/down direction, a protruding amount (a cutting depth) of the cutting blade 22 protruding downward from the lower surface of the base 10 can be changed. In contrast, when screw-fastening the fixing screw shaft 73 by rotating (operating) the fixing lever 72 in the reverse direction, the position of the device main body 20 can be fixed and the extent of downward protrusion, or the cutting depth of the cutting blade 22, with regard to the work piece W, can be fixed.

As shown in FIG. 3, the cutting depth adjustment mechanism 70 may be disposed between the rear part of the cutting blade cover 21 and the handle 50. Because of this configuration, the working space with respect to the right side of the handle 50 may be small proximal to the cutting depth adjustment mechanism 70. As discussed above, the right half-split housing 59R of the handle 50 may be divided into three parts 59R1, 59R2 and 59R3, and each of the parts can be separately detached from the left half-split housing 59L. Because of this compartmentalized configuration, the maintenance work of, for example, the switch main body 58 and the power cord 55 can be easily and effectively performed by only having to remove one of the three parts of the right half-split housing 59R, as compared to a case where the whole of the right half-split housing 59R has to be detached from the left half-split housing 59L. Especially, as shown in FIG. 3, when the cutting depth is adjusted to the maximal downward protrusion, the second division part 59R2 may be positioned on the left side of the fixing lever 72. In this case, it may be difficult to detach the second part 59R2 from the left half-split housing 59L, but the first and third parts 59R1, 59R3 can still be easily detached from the left half-split housing 59L. Because of this configuration, the maintenance work of the switch main body 58 and the illumination switch 54 etc, can be easily performed. In this respect, with compartmentalization of the right half-split housing 59R as described above, maintainability can be improved, as compared to a case where the whole of the right half-split housing has to be detached from the left half-split housing 59L.

Figure 11:
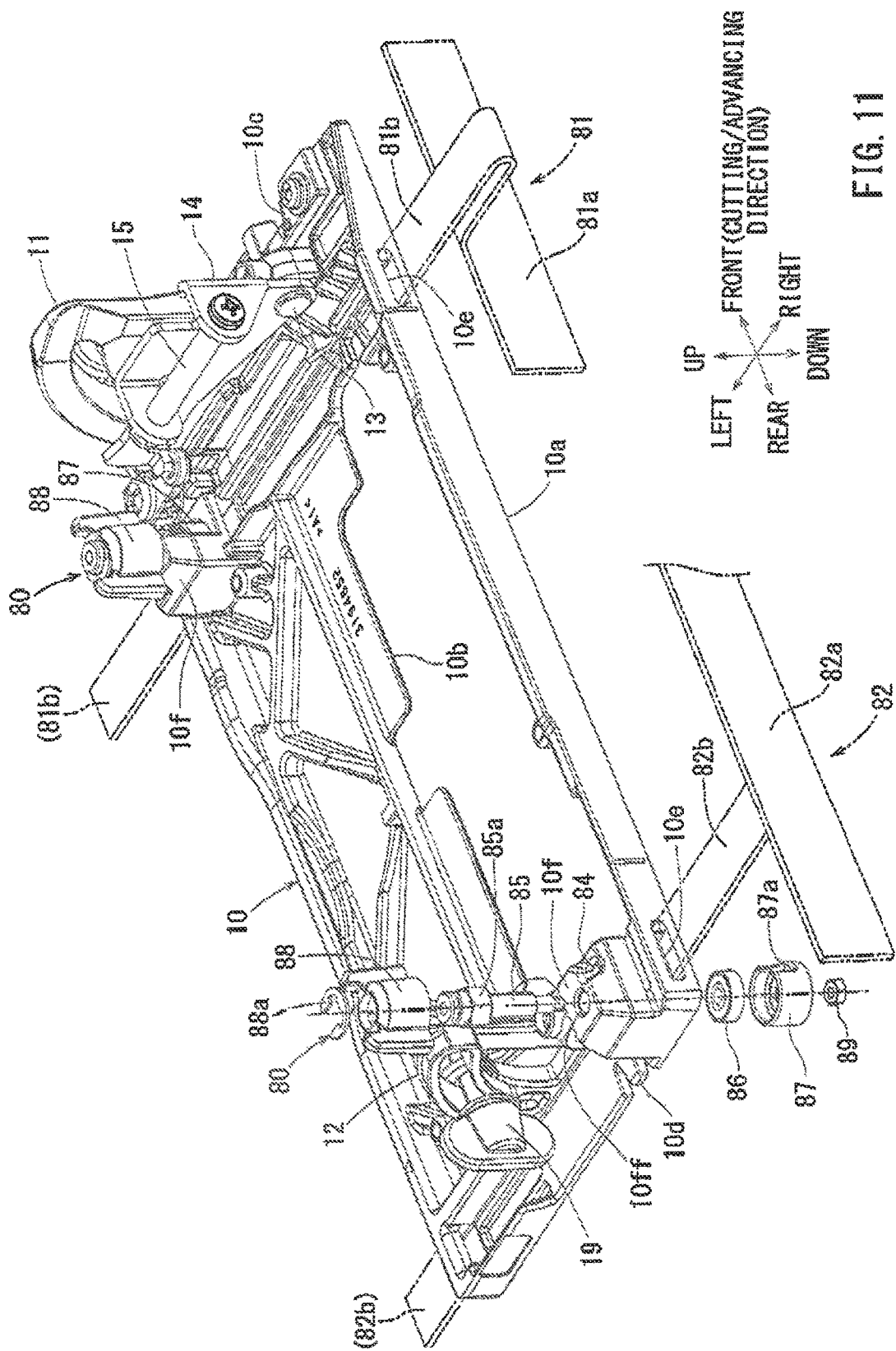
FIG. 11 is a perspective view of a base, where a ruler-fixing device for fixing a guide ruler is shown in a disassembled manner.

FIG. 11 shows the base 10 as one unit. A desired guide ruler may be selected from two kinds of parallel guide rulers, i.e., a short parallel guide ruler 81 and a long parallel guide ruler 82. The selected ruler can be attached to the base 10. The short parallel guide ruler 81 may include a short ruler main body 81a and one connection bar 81b. The long parallel guide ruler 82 may include a long guide ruler main body 82a and two connection bars 82b. The parallel guide ruler 81 (82) may be configured such that by bringing the ruler main, body 81a (82a) disposed along the right side of the base 10 into contact with the right end edge of the work piece W, the cutting device 1 can be guided along the right end edge of the work piece W. The parallel guide ruler 81 (82) may be fixed to the base 10 via the connection bar 81b (82b).

Figure 12:
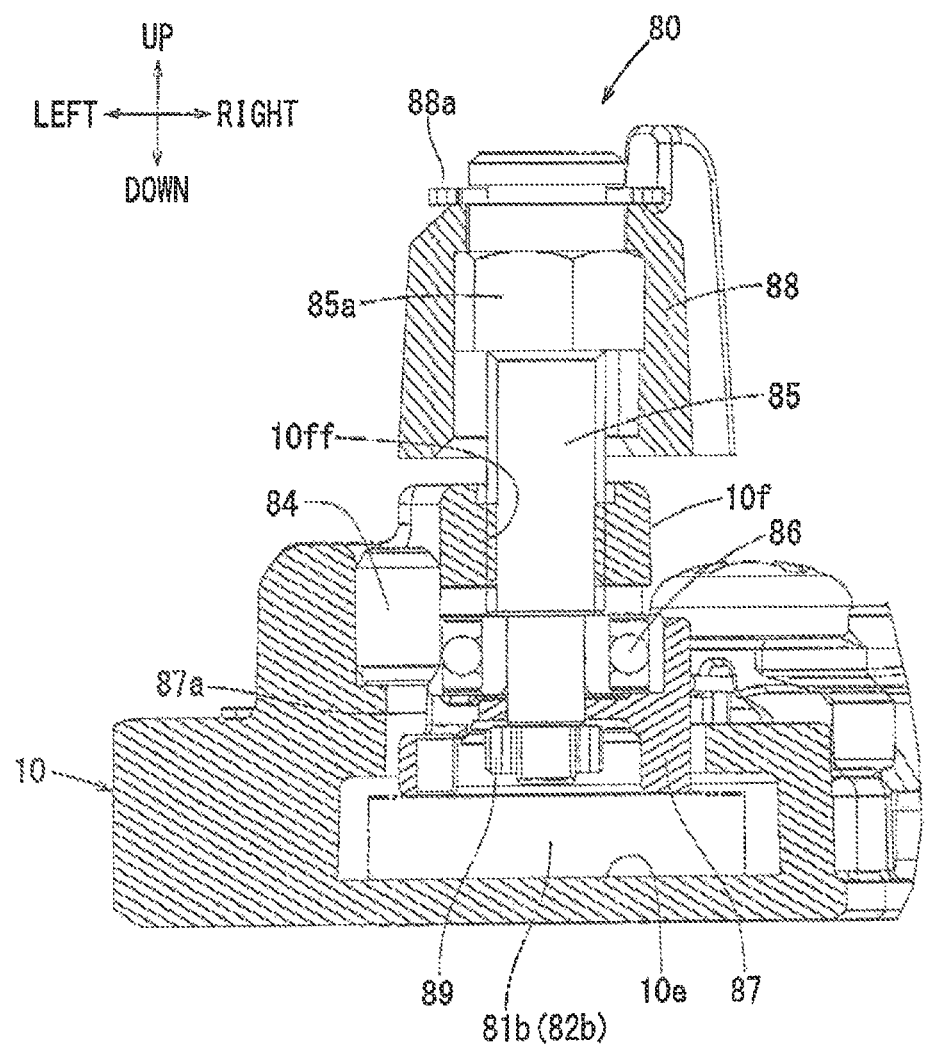
FIG. 12 is a cross-sectional view taken along line (XII)-(XII) of FIG. 3, showing the ruler-fixing device in a vertical cross section.

As shown in FIG. 11, the base 10 may be provided with ruler retain grooves 10e at a front part and a rear par thereof. The left end and the right end of the ruler retain grooves 10e may be open to the left end part and the right end part of the base 10, respectively. The position of the ruler main body 81a (82a) may be finely adjusted by adjusting the position of the connection bar 81b (82b) within the ruler retain groove 10e (in the left/right direction). The position of the ruler main body 81a (82a) may be fixed by fixing the position of the connection bar 81b (82b) within the ruler retain groove 10e. A ruler-fixing device 80 may be provided in each of the ruler retain grooves 10e in order to fix the position of the connection bar 81b (82b). To this end, two ruler-fixing devices 80 of the same configuration may be disposed at the front part and the rear part of the device. FIG. 12 shows the detail of the ruler-fixing device 80.

As shown in FIGS. 11 and 12, the ruler-fixing device 80 may include a fixing screw shaft 85, a ball bearing 86, a pressing member 87 and an operation member 88. The ruler-fixing device 80 serves to fix the ruler main body 81a, 82a in a desired position with respect to the lateral part of the base 10 by pressing the pressing member 87 to the connection bar 81b, 82b of the parallel guide ruler 80. The pressing member 87 may be pressed to the connection bar 81b, 82b by a motive force (a screw-fastening force) that is generated by a rotation operation of the operation member 88 (by rotating the operation member 88). The fixing screw shaft 85 may be screwed into a fixing screw hole 10ff of a fixing base 10f provided in the base 10. The operation member 88 may protrude radially outward from and be attached to the head of the fixing screw shaft 85. The operation member 88 may be fixed to the head of the fixing screw shaft 85 such that rotation of the operation member 88 is stopped by a nut 85a and also the operation member 88 is prevented from removing (slipping off) in an axis direction by a retaining ring 88a. When the operation member 88 is rotated, the fixing screw shaft 85 may be moved in the up/down direction. The pressing member 87 may press the upper surface of the connection bar 81b, 82b by the motive force (screw-fastening force) generated by the fixing screw shaft 85 when moving downward.

The pressing member 87, which serves as a friction reduction member, may be attached to the lower part of the fixing screw shaft 85. The pressing member 87 may be supported via the ball bearing 86 so as to be relatively rotatable around the fixing screw shaft 85. In the present embodiment, the ball bearing 86 may be used. However, another rolling bearing such as a needle bearing or a roller bearing may also be used. The pressing member 87 may be made of resin and formed in a tubular shape (cylindrical shape) with a diameter that is larger than fixing screw shaft 85, where the pressing member protrudes radially outward from the ball bearing 86. The pressing member 87 may be provided with a cutout (notch) 87a in a circumferential direction. An elastic rubber pin 34 made of rubber that is pushed (driven) into the fixing base 10f may enter the cutout 87a. When the rubber pin 84 enters the cutout, it may be pressed on by the outer ring of the ball bearing 86. In effect, by the rubber pin 84 being pressed, rotation of the outer ring of the ball bearing 86 may be restricted. As a result, the pressing member 87 may be prevented from rotating. The pressing member 87 may be restricted from detaching by a fixing nut 89 that is screw-fastened to the lower part of the fixing screw shaft 85. The lower part of the fixing screw shaft 85 and the fixing nut 89 may be positioned so as not to protrude downward relative to the lower surface of the pressing member 87. When the fixing screw shaft 85 is fastened and moved downward, the pressing member 87 may be moved downward together with the fixing screw shaft 85 and may press the upper surface of connection bar 81b (82b) of the parallel guide ruler 81 (82). At this time, the pressing member 87 presses the connection bar 81*b* (82*b*) such that rotation of the pressing member 87 is prevented.

In the prior art, which is disclosed, for example, in Japanese Laid-Open Patent Application No. 2006459786, a tip of the fixing screw may directly press the connection bar to fix the position of a parallel guide ruler. However, because of this configuration, there is a problem, in that a dent caused by the friction resistance of the tip of the fixing screw that presses the connection bar in the rotation direction may be generated on the connection bar. As a result, the dent might inadvertently offset the position of the connection bar when the fixing screw presses the connection bar at the same position in a recurring manner, which makes it difficult to finely adjust the position of the parallel guide ruler in a correct manner. In contrast, according to the ruler-fixing device 80 of the present embodiment, the pressing member 87 that is made of resin and is prevented from rotating by the rubber pin 84, rather than primarily frictional resistance between the pressing member 87 and the connection bar 81*b* (82*b*), may press the upper surface of the connection bar 81*b* (82*b*). Thus, a dent (scar) is not be generated on the connection bar 81*b* (82*b*) and the positional offset of the parallel guide ruler may be prevented. As a result, the ruler main body 81*a* (82*a*) can be correctly fine adjusted.

Furthermore, in another prior art relating to the ruler fixing structure, which is disclosed, for example, in Japanese Laid-Open Patent Application No. 2013-248740, the occurrence of the aforementioned dent may be reduced where a supporting member surface-contacts the connecting bar when the fixing screw is fastened. However, here too, friction caused by the surface contact of the supporting member might offset the position of the connection bar. Because of this configuration, as with the other prior art of Japanese Laid-Open Patent Application No. 2006-159786, it may be difficult to finely adjust the position of the parallel guide ruler in a correct manner.

In contrast to the prior art, the ruler-fixing device 80 of the present embodiment may be configured such that the pressing member 87, which is made of resin and has a diameter larger than that of the fixing screw shaft 85, may press the connection bar 81*b* (82*b*). Thus, damage such as the dent (scar) may not be generated on the connection bar 81*b* (82*b*) due to the material properties and distribution of surface area. Furthermore, the pressing member 87 may be supported via the ball bearing 86 so as to be relatively rotatable with respect to the fixing screw shaft 85, and prevented from rotating via rubber pin 84 as described above. Because of this configuration, the motive force (screw-fastening force) of the fixing screw shaft 85 in the rotation direction is not be transmitted to the pressing member 87. As a result, the pressing member 87 does not offset the position of the connection bar 81*b* (82*b*) while the fixing screw shaft 85 is screw fastened. Because of this configuration, only a pressing force, and not a motive force, is applied to the upper surface of the connection bar 81*b* (82*b*) in a thickness direction via the pressing member 87. Accordingly, a friction force that would potentially cause the positional offset of the connection bar 81*b* (82*b*) is not generated. As a result, the position of the connection bar 81*b* (82*b*) and eventually the position of the ruler main body 81*a* (82*a*) may be finely adjusted in a precise manner that more accurately reflects the desired adjustment.

In the above-discussed configuration, the rubber pin 84 may press the outer ring of the ball bearing 86 in order to prevent rotation of the pressing member 87. The pressing member 87 may be prevented from rotating only by entering of the rubber pin 84 or an engaging pin in the cutout (notch) 87*a*.

Figure 20:
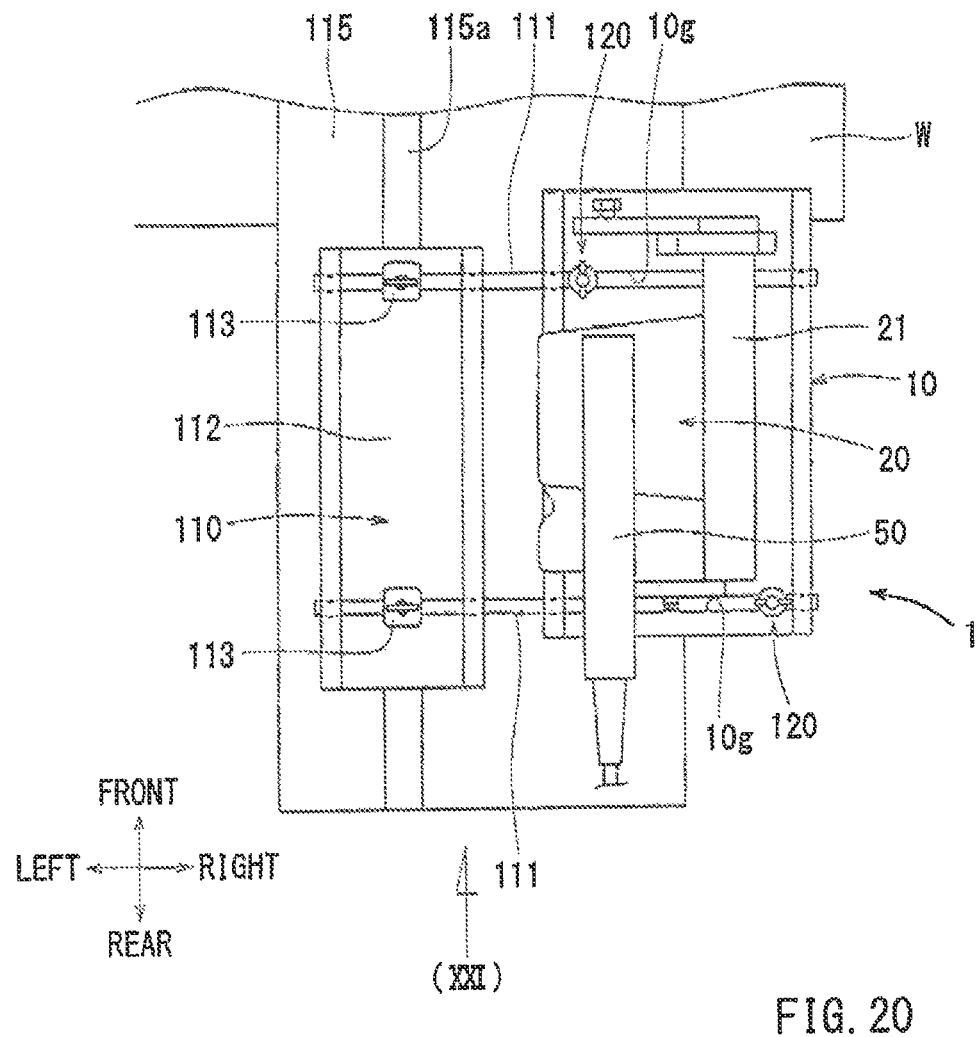
FIG. 20 is a plan view of the cutting device with a long guide ruler attached thereto via an adaptor for the long guide ruler.
Figure 21:
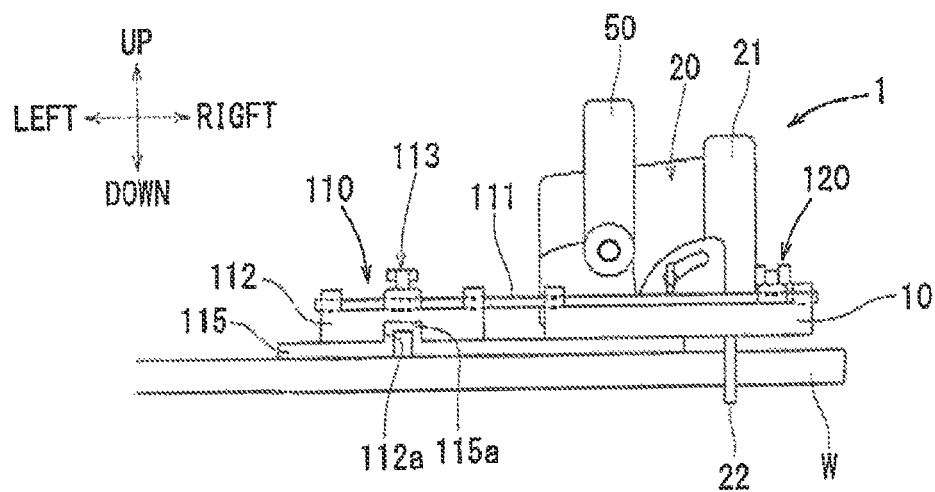
FIG. 21 is a rear view of the cutting device with the long guide ruler attached thereto via the adaptor for the long guide ruler, as seen from (XXI) of FIG. 20.

In the above-discussed embodiment, the ruler-fixing device 80 may fix the position of the parallel guide ruler 81, 82. Such devices as the ruler-fixing device 80 can serve as a fixing device tool-fixing device) for fixing various kinds of auxiliary tools, as well as the already described parallel guide ruler 81, 82, to the base 10. FIGS. 20 and 21 show the fixing device (tool-fixing device 120) for fixing a long guide ruler adaptor 110 to the base 10 of the cutting device 1 (portable cutting device) as one example of the auxiliary device. The tool-fixing device 120 may have the same configuration as the ruler-fixing device 80. Descriptions of the structural elements and configurations in common with the parallel guide ruler 81 (82) are omitted in case the same reference numerals are utilized.

As shown in FIG. 20, the base 10 may be provided with a retention groove 10*g* for fixing a connection bar 111 of the long guide ruler adaptor 110. Similar to the connection bar 81*b* (82*b*) of the parallel guide ruler 81 (82), the connection bar 111 of the long guide ruler adaptor 110 may also be formed in a long band shape. The same plate material as the connection bar 81*b* (82*b*) may also be used for the connection bar 111. The retention groove 10*g* may be provided at the front side and the rear side, respectively, extending in the left and right directions. The left end and the right end of the retention groove 10*g* may be open at the left side and the right side of the base 10, respectively. The position of the long guide ruler adaptor 110 may be finely adjusted by adjusting the position of the connection bar 111 within the retention groove 10*g* (the position in the loft/right direction). The position of the long guide ruler adaptor 110 in the left/right direction may be fixed by fixing the position of connection bar 111 within the retention groove 10*g*. The tool-fixing device 120 may be provided in each of the retention grooves 10*g* in order to fix the position of the connection bar 111.

The long guide ruler adaptor 110 may include two connection bars 111 and the base 112 that is formed in a rectangular flat plate shape. Each of the connection bars 111 may be screwed and fixed to the upper surface of the base 112 by a screw-fixing device 113. A guide groove 112*a* into which a guide protrusion 115*a* of the long guide ruler 115 can be inserted may be provided on the lower surface of the base 112. The long guide ruler adaptor 110 may be used in a manner such that the base 112 is brought into contact with the upper surface of the long guide ruler 115 where the guide protrusion 115*a* is inserted into the guide groove 112*a*. The cutting work by the portable cutting device 1 can be performed utilizing the long guide ruler 115 and the long guide ruler adapter 110.

As a means for fixing the long guide ruler adaptor 110 (where long guide ruler adaptor 110 includes the connection bars 111 of the long guide ruler adaptor 110, as well as the base 112) to the base 10 of the cutting device 1, the tool-fixing device 120 that has the same configuration as the ruler-fixing device 80 may be used. By using the tool-fixing device 120, friction of the pressing member 87 with regard to the connection bar 111 may be reduced owing to the ball bearing 86 serving to reduce friction. As a result, damage such as the dent (scar) may be prevented from generating on the connection bar 111. Furthermore, by reducing friction by the pressing member 87, the positional offset of the connection bar 111 may be prevented. As a result, the long guide ruler adaptor 110 can be finely adjusted in a correct manner with regard to the base 10.

Other than the long guide ruler adaptor 110 and the parallel guide ruler 81 (82), the above-discussed tool-fixing device 120 (ruler-fixing device 80) may be used in (applied to), for example, a case where an auxiliary equipment of small-sized dust collectors or water supply equipment is connected (joined) to the base 10 as an auxiliary device.

Figure 13:
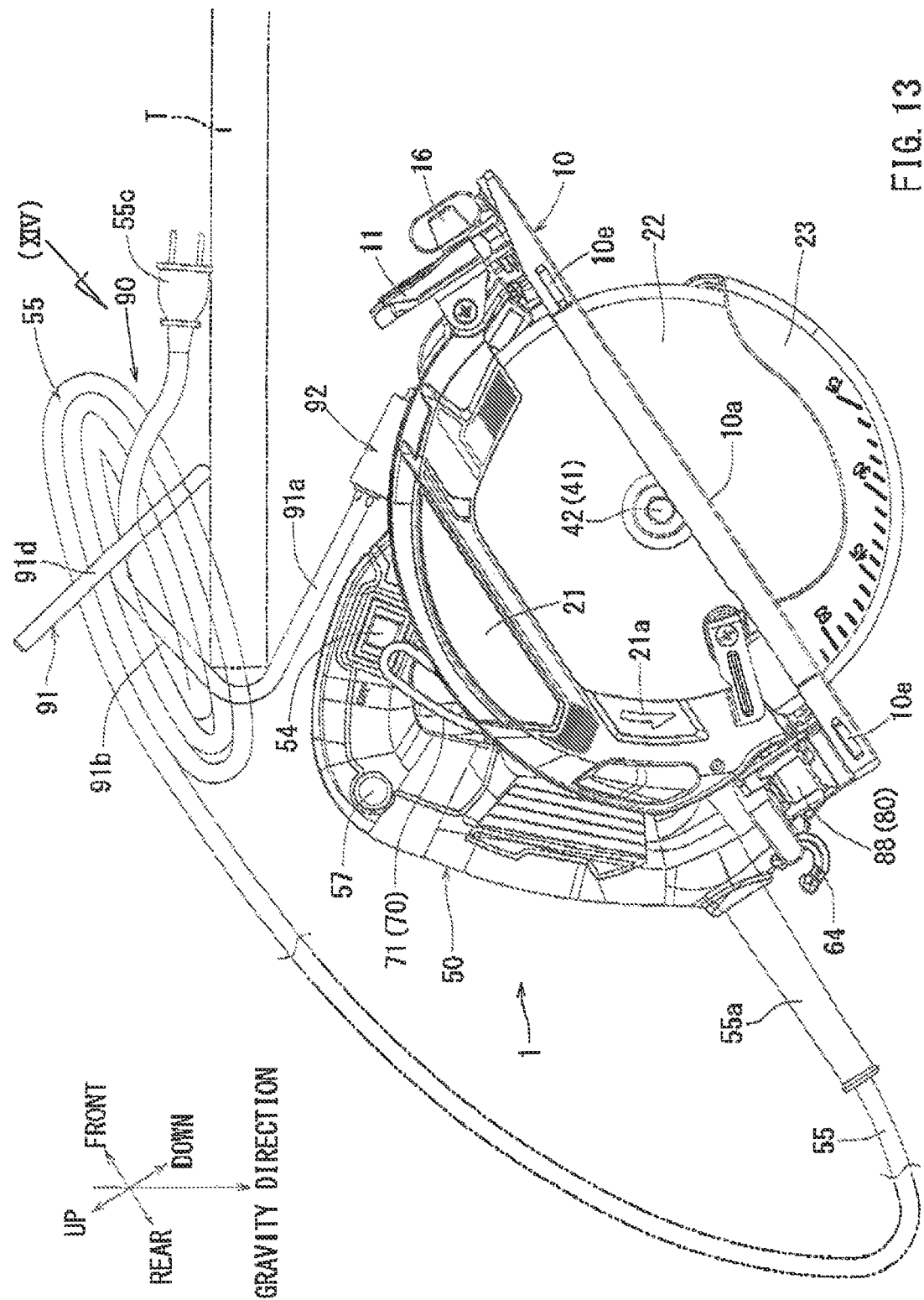
FIG. 13 is a side view of the cutting device in a hanging manner.
Figure 14:
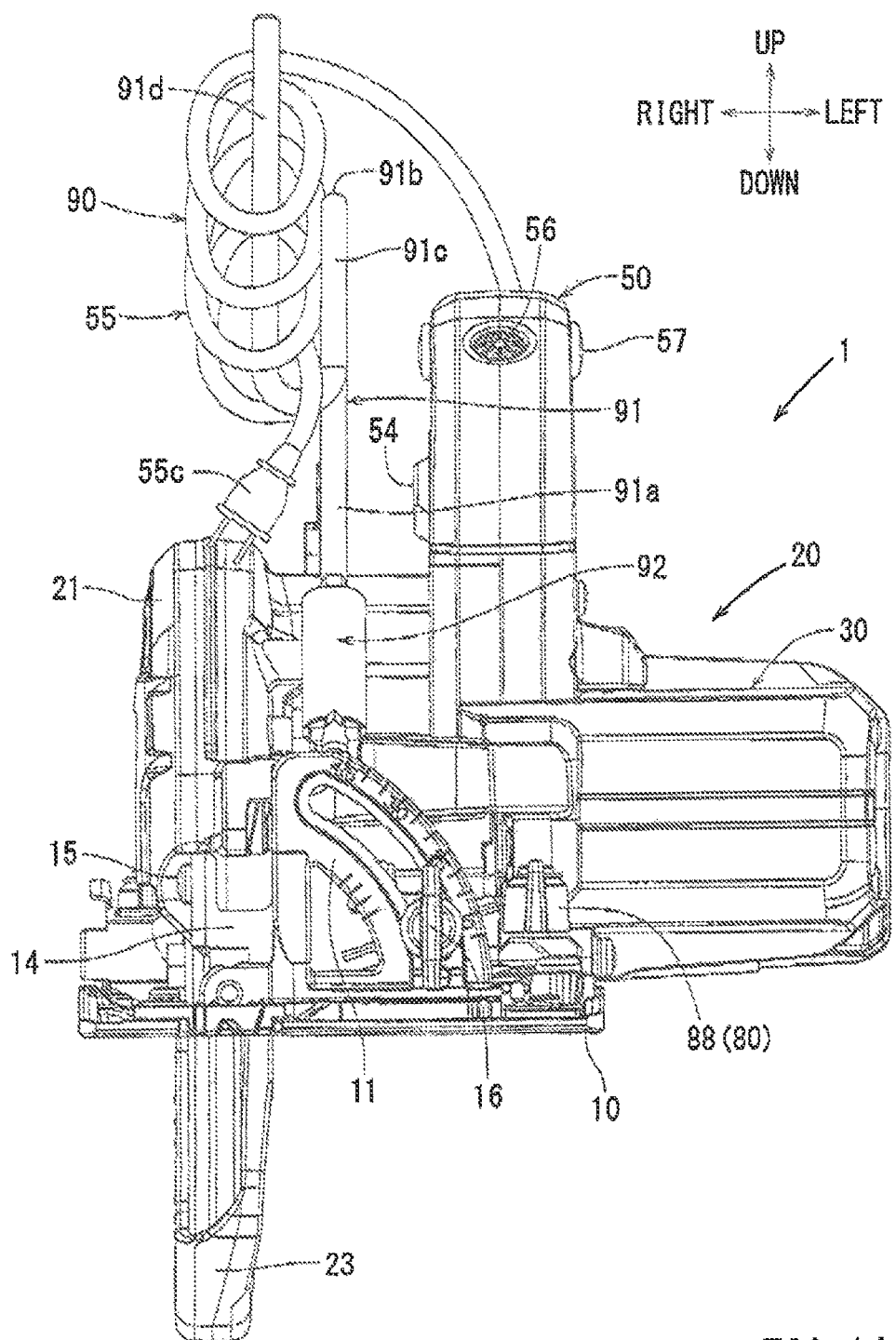
FIG. 14 is a front view of the cutting device in a hanging manner as seen from (XIV) of FIG. 13.

FIGS. 13 and 14 show the cutting device 1 to which a hanging hook 90 is additionally attached for hanging the cutting device 1, for example, to a stepladder or at the edge of a workbench (hanging portion T). The hanging hook 90 may include a hook main body 91, which is made of steel wire with about 5 mm in thickness and is bent at three positions, and a support 92 for supporting the hook main body 91 on the left side (backside) of the cutting blade cover 21. As shown in FIGS. 13 and 14, the hook main body 91 may include a base shaft 91a, a first shaft 91b that extends from the base shaft 91a and is bent at an acute angle relative to 91a, a second shaft 91c that extends from the first shaft 910 and is bent nearly downwards, and a third shaft 91d that extends from the second shaft 91c and is bent upwards forming in a U shape. The third shaft 91d may be configured to extend longer than the second shaft 91c in the upward direction.

The support 92 may have a tubular shape such that the base shaft 91a of the hook main body 91 is passed through the inner circumference of the support 92. The support 92 may be attached close to the front of the left side (backside) of the cutting device cover 21. The support 92 may be fixed in a direction such that the longitudinal axis of the support 92 is slanted rearwards with respect to the base 10, forming an acute angle with respect to base 10. The lower part of the base shaft 91a may be inserted into the inner circumference of the support 92 and the hook main body 91 may be rotatably supported about the longitudinal axis of the base shaft 91a. The base shaft 91a may be supported by the support 92 so as not to be displaceable in the axial up-to-down direction. By rotating the hanging hook 90 about the longitudinal axis of the base shaft 91a, the hanging hook 90 may be positioned such that the second shaft 91c and the third shaft 91d are disposed on the front side (a use position of the hanging hook 90), as shown in FIG. 13. Additionally, by further rotation, the hanging hook 90 may be positioned such that the second and third shaft 91c, 91d are disposed on the rear side, or the handle 50 side (a housing position of the hanging hook 90).

As shown in FIGS. 13 and 14, the cutting device 1 can be hung up by positioning the hanging hook 90 at the end of a hanging portion T (hanging base T) between the base shaft 91a and the second and third shafts 91c, 91d. The hanging hook 90 of the present embodiment may have a function of hooking and storing the power cord 55 as well as the function of hanging up the cutting device 1. As shown in FIGS. 13 and 14, when not used, the power cord 55 may be hooked by the third shaft 91d in a coiled and winding manner.

The third shaft 91d serves as the power-cord-hooking portion, wherein a bent portion of the third shaft 91d is configured such that the tip end of the third shaft 91d, at the opposite end of 91d from the bent portion, is directed upwards when the cutting device 1 is hung up by the hanging hook 90. As shown in FIG. 14, the tip end of the third shaft 91d may be directed upwards with respect to the direction of gravity when the cutting device 1 is hung up. Because of this configuration, the power cord 55 that is hooked by the third shaft 91d may be moved to (because of gravity) and stored in the bottom side of the U-shaped bent portion that is formed by the second shaft 91c and the third shaft 91d. As a result, the power cord 55 may not be removed from the third shaft 91d.

As discussed above, by hooking the unused power cord 55 in the third shaft 91d of the hanging hook 90, the power cord 55 can be orderly and neatly stored in a coiled and winding manner. In the prior art disclosed in, for example, Japanese Laid-Open Patent Publication No. 2006-116815, the unused power cord can be wound around the cutting device main body. However, in this case, it may take time to pull out the power cord when using the cutting device and thus the user may not quickly start the cutting work. In contrast, in the present invention, according to the power-cord-hooking portion (the third shaft 91d), the power cord 55 can be quickly pulled out from the third shaft 91d and inserted to the power outlet when using the cutting device 1. Because of this configuration, the cutting device 1 can be quickly started.

Figure 15:
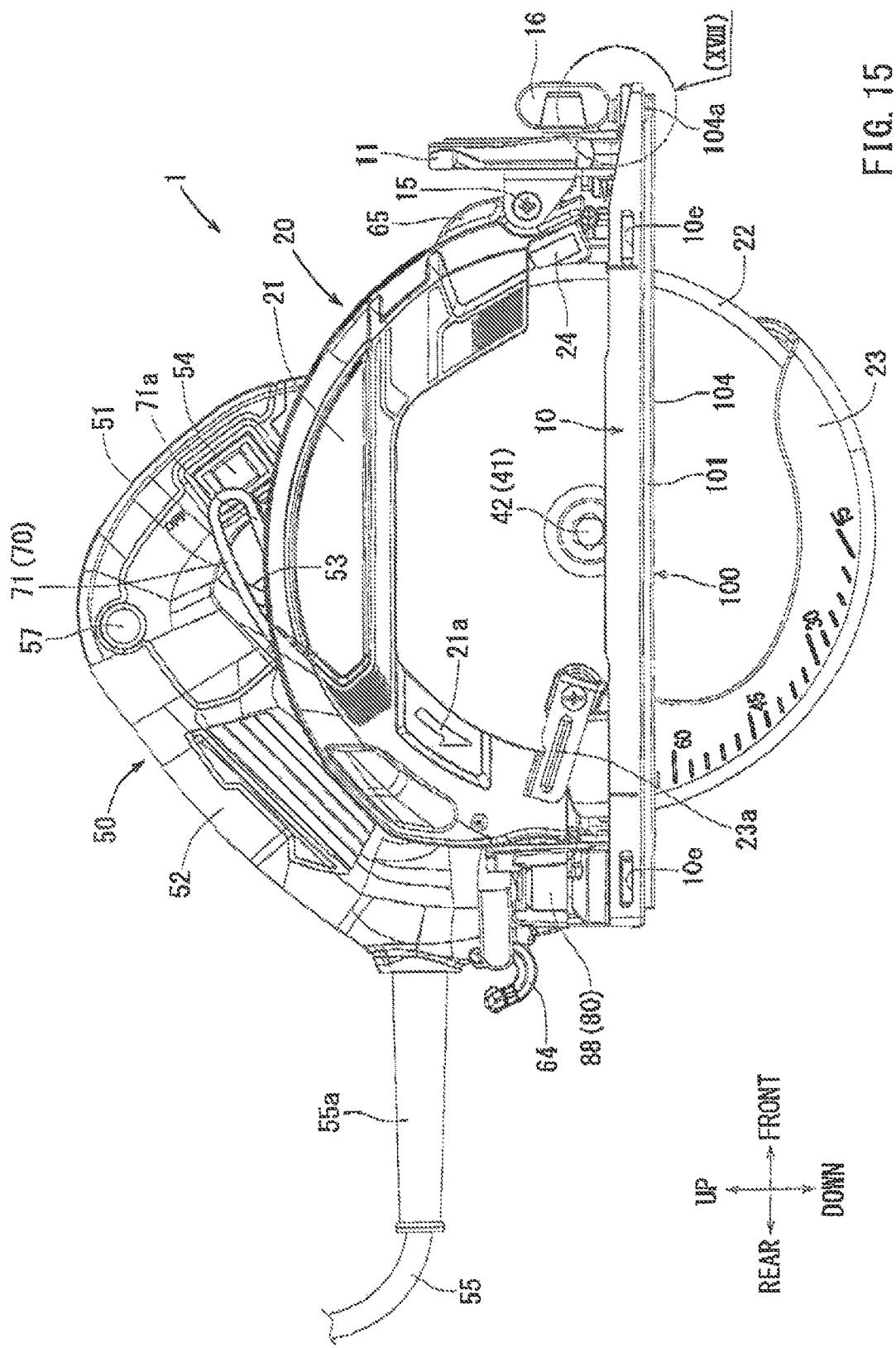
FIG. 15 is an overall side view of the cutting device with a sliding plate attached to a lower surface of the base.
Figure 16:
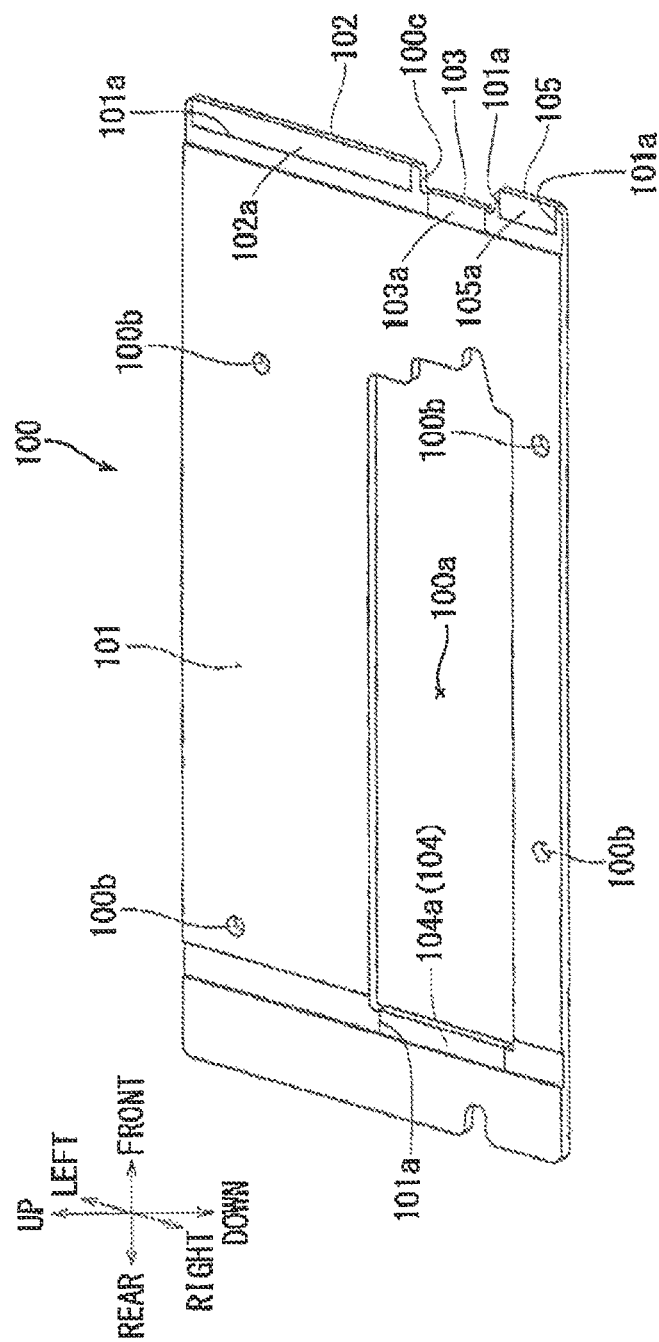
FIG. 16 is a perspective view of the sliding plate as seen from above.
Figure 17:
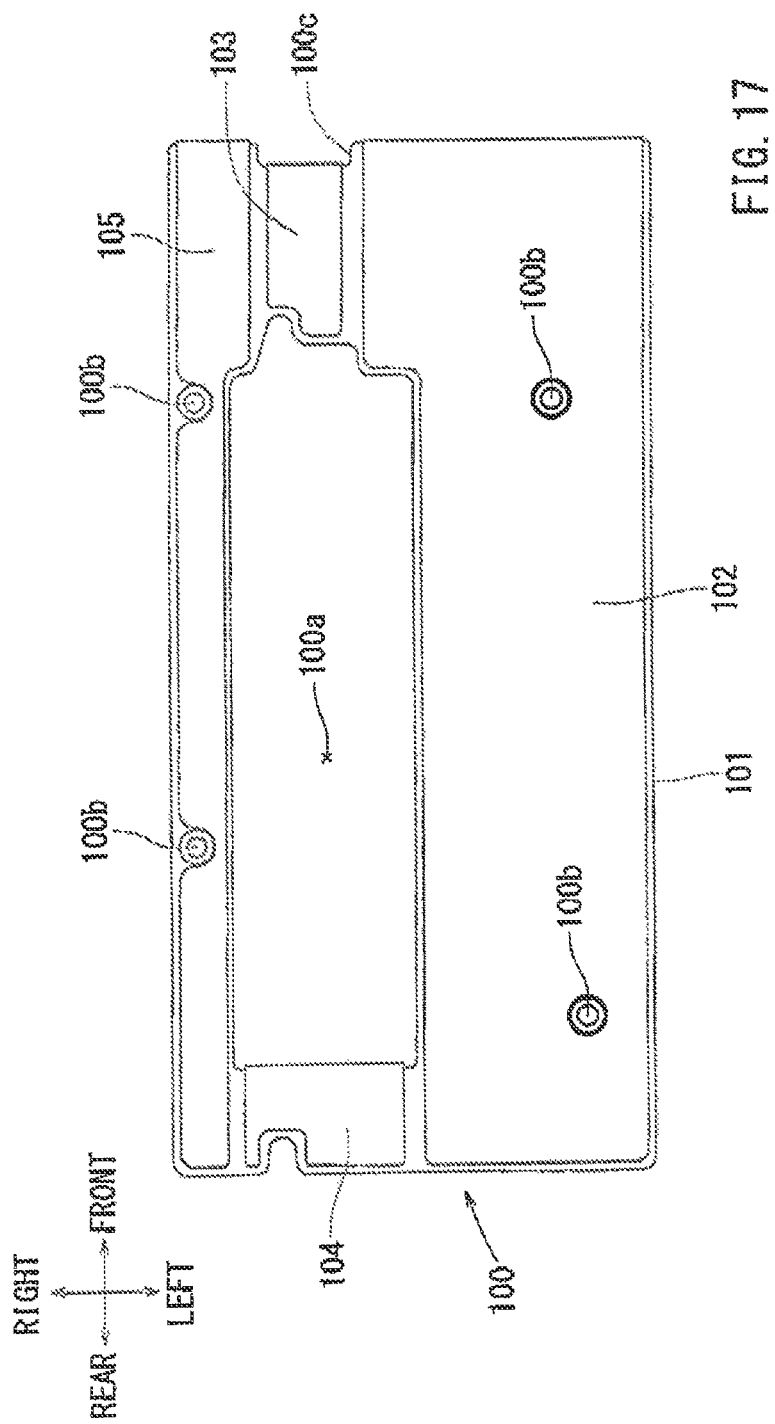
FIG. 17 is a bottom view of the sliding plate.

FIG. 15 shows the cutting device 1 in which a measure for improving slidability of the base 10 with regard to the cutting device W is taken. The cutting device 1 shown in FIG. 15 may have a feature in that a sliding plate 100 is detachably attached to the lower surface of the base 10 (contact surface 10a of the work piece W). Descriptions of the structural elements and configurations in common with the device main body 20 etc. are omitted in case the same reference numerals are utilized. FIG. 16 shows the upper surface of the sliding plate 110 and FIG. 17 shows the lower surface of the sliding plate 110. The sliding plate 100 may be provided with an insertion window 100a corresponding to the window 10b of the base 10. The sliding plate 100 may be screwed and attached to the base 10 with the upper surface thereof overlapped with the lower surface of the base 10. Four fixing screws (not shown) may be screwed to lower surface of the base 10 via corresponding four screw holes 100b. When the four screws are loosened, the sliding plate 100 may be detached from the lower surface of the base 10.

The sliding plate 100 may be configured such that four sheets 102 to 105 may be attached to the lower surface of an attaching plate 101. The four sheets 102 to 105 may be made of ultra high molecular weight polyethylene, having a small friction coefficient. As shown in FIG. 17, the sheet 105 may be attached to the attaching sheet 101 along the right edge side of the lower surface of the base 10 in the front-to-rear direction, and sheet 102 may be attached along the left edge side of the lower surface of the base 10. Furthermore, the sheet 103 may be attached at the front of the insertion window 100a, and the sheet 104 may be attached at the rear of the insertion window 100a.

As shown in FIGS. 16 and 17, the sliding plate 100 may be provided with a recess 100c for accommodating the guide 10c of the base 10 at the front thereof. The sheet 103 may be attached and extend from the recess to the front side of the insertion window 100a. The sheet 104 may be attached and extend from the rear side of the insertion window 100a to the rear end of the attaching plate 101. Each of the sheets 102 to 105 may be attached to the attaching plate 101 by an adhesive.

As shown in FIG. 16, each end of the four sheets 102 to 105, which are located on the front side in the cutting/advancing direction, may be folded back from the lower surface to the upper surface of the attaching plate 101. In FIG. 16, symbols 102a, 103a, 104a and 105a depict the folded-back portions of the sheets 102 to 105, respectively, from the lower to the upper surface of the attaching plate 101. The sheet 103 may be folded back from within the recess 100e to the upper side. When the sliding plate 100 is attached to the lower surface of the base 10, the folded-back portions 102a, 103a, 104a and 105a may be held (sandwiched) between the lower surface of the base 10 and the sliding plate 100. In this way, the sheets 102 to 105 on the front side in the cutting/advancing direction may be folded back from the lower to the upper side of the attaching plate 101, and the folded-back portions 102a, 103a, 104a and 105a may be held (sandwiched) between the lower surface of the base 10 and the sliding sheet 100. Because of this configuration, the sheets 102 to 105 may be prevented from peeling off from the attaching plate 101 even when the cutting device 1 is moved in the cutting/advancing direction and the lower surface of the base 10 (in this case, the lower surface of the sliding plate 100) is sliding along the upper surface of the work piece W.

Figure 18:
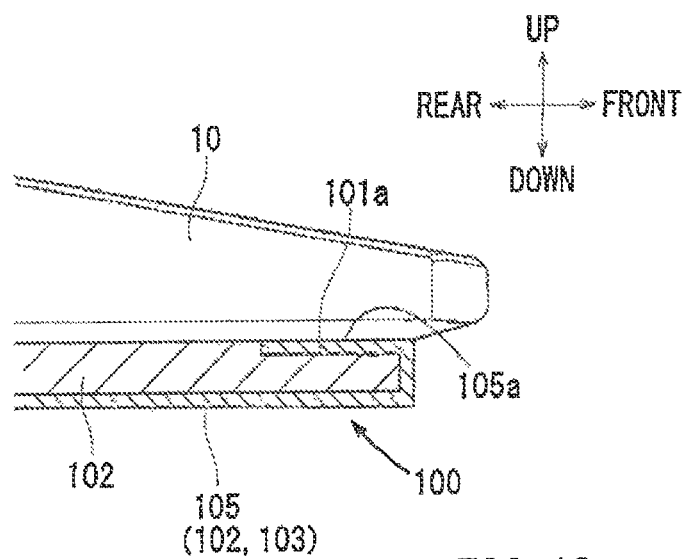
FIG. 18 is an enlarged view of (XVIII) of FIG. 15, showing a periphery of the front of the base and the sliding plate.

As shown in FIG. 18, the folded-back portions 102a to 105a of the sheets 102 to 105 may be folded back within grooves 101a provided at the upper surface of the attaching plate 101. Because of this grooved configuration of the attaching plate 101, the folded-back portions 102a to 105a nay be folded back flush with the upper surface of the attaching sheet 101, where the thickness of the plate 101 (in the up-to-down direction) can thereby be maintained. As a result, the attaching plate 101 may be attached to the base 10 in a flush manner such that there is no gap (space) or clearance between the lower surface of the base 10 and the attaching plate 101.

As discussed above, by attaching the sliding plate 100, to which the sheets 102 to 105 having small friction resistance are attached (stuck), to the lower surface of the base 10, the work piece W can be prevented from being damaged, and the cutting device 1 can move smoothly. As a result, the cutting efficiency of the cutting device 1 is improved.

The sliding plate 100 may be removed from the lower surface of the base 10 by removing the screws at the four positions 100b. Thus, in a case where any of the sheets 102 to 105 peels off, the sliding plate 100 may be replaced with another sliding plate 100 that is preliminary prepared. As a result, the cutting work can be restarted in a short time.

Furthermore, as discussed above, the four sheets 102 to 105 may be separately attached to the sliding plate 100. Because of this configuration, the four sheets 102 to 10 (especially, the sheet 103) can be correctly folded back, corresponding to the concave-convex shape (the recess 100e) of the attaching plate 101.

In the prior art such as, for example, in Japanese Laid-Open Patent Publication No. 2006-26886, fluorine-coatings are directly applied to the lower surface of the base in order to improve its slidability. Furthermore, Japanese Laid-Open Patent Publication No. 2015-136873 discloses polyethylene sheets are directly adhered to the lower surface of the base in order to improve its slidability. According to these disclosures, the slidability of the base with respect to the work piece can be improved. However, these methods may not correspond to a case where high slidability is not required. Furthermore, Japanese Laid-Open Patent Publication No. 2006-289869 discloses a plate to which fluorite-coatings are applied is detachably attached to the lower surface of the base in order to improve its slidability. However, the flourite-coatings may have a problem of decreasing the slidability in a case where a water content of the work piece is high. Furthermore, Japanese Laid-Open Patent Publication No. 2001-315075 disclosed that a plate made of ultra high molecular weight polyethylene is attached to the lower surface of the base in order to improve its slidability. However, when the surface of the plate is damaged etc., the whole plate has to be replaced. As a result, maintenance costs are increased.

In contrast, according to the sliding plate 100 of the present embodiment, the attaching plate 101, to which the sheets 102 to 105 with small friction coefficient made of ultra high molecular weight polyethylene are attached, may be screwed to the lower surface of the base 10. Because of this configuration, when high slidability is not needed for the base 10, the attaching plate 101 can be easily detached from the base 10. Furthermore, fluorine-coatings may not be applied to the sheets 102 to 105, but the sheets 102 to 105 may be made of ultra high molecular weight polyethylene, which differs from the prior arts. Because of this configuration, even in a case where the work piece W is wet with water, etc., high slidability can be obtained. Furthermore, the sheets 102 to 105 made of ultra high molecular weight polyethylene may adhere to the attaching plate 101, bound by an adhesive as described. Because of this configuration, when one of the sheets 102 to 105 is peeled off or damaged, only the peeled-off or damaged sheet may be needed to be replaced. In this respect, compared with the case where the plate with fluorine-coatings is replaced, the maintenance cost can also be substantially decreased.

According to the portable machining device (cutting device) 1 of the present embodiment, the ruler-fixing device 80 for fixing the parallel guide rulers 81, 82 with respect to the base 10 may be configured such that the parallel guide rulers 81, 82 are fixed by indirectly applying the fastening force (pressing force) in the up-to-down axial direction of the fixing screw shaft 85 which transfers the force to the pressing member 87 serving as the friction reduction member. This configuration is in contrast to a configuration where the parallel guide rulers 81, 82 are fixed by directly pushing the fixing screw shaft 85 to the connection bar 81b, 82b, as is present in the prior art. Because of the present embodiment's configuration with the pressing member, dents (scar) generation may be prevented on the connection bar 81b (82b), representing en improvement over conventional devices. Furthermore, the pressing member 87 may be made of synthetic resin, and thus damage such as dent (scar) generation can further be unfailingly prevented from occurring on the connection bar 81b (82h).

Furthermore, the pressing member 87 may be rotatably supported by the fixing screw shaft 85 via the ball bearing 86. Thus, in a state where the pressing member 87 is pressed onto the connection bar 81b (82b) by the rotation of the operation member 88, the pressing member 87 itself may be restricted from rotating in the screw-rotating direction. Because of this configuration, even if the fastening screw shaft 85 is rotated, the motive force of the fixing screw shaft 85 is not transferred to the pressing member 87 in the rotational direction. As a result, the pressing member 87 does not rotate and any positional offset of the connection bar 81b (82b) which would have resulted from force being transferred in the rotational direction may thereby be restricted, which can enable the parallel guide ruler 81 (82) to be precisely positioned.

The embodiments discussed above may be further modified without departing from the scope and spirit of the present teachings. In the embodiment discussed above, the ruler-fixing device 80 may be configured such that the pressing member 87 may be rotatably supported by the fixing screw shaft 85 via the ball bearing 86 serving as the friction reduction member. However, instead of the ball bearing 86, a bearing made of synthetic resin with low friction coefficient or a sliding bearing such as a bearing metal made of oil impregnated metal can alternatively be used. Furthermore, the pressing member 87 may also alternatively be configured so as to be directly supported by the lower portion of the fixing screw shaft 85, instead of a ball bearing. In this case, it may be desirable to pour a lubricant agent such as grease etc. within the inner periphery hole of the pressing member 87 in order to reduce friction.

Furthermore, in the configuration where said lubricant agents such as grease etc. are used, they may be applied to the tip end of the operation member 88 (the tip end of the fixing screw shaft 85) and/or on the upper surface of the connection bar. According to such a configuration, with the lubricant agent present, the transfer of rotational motive force instead of downward motive force of the fixing screw shaft to the friction reduction member, caused by the rotation of the operation member, can be reduced, and thus damage and/or the positional offset of the connection bar can be restricted.

Furthermore, in the above-discussed embodiment, the portable miter saw may be referred to as the cutting device 1 as the portable machining devices. However, the above-discussed ruler-fixing device 80 can also be applied to a router that is used for grooving, a jigsaw that is used for cutting a material by reciprocating the cutting blade in the up/down direction, and many other types of cutting devices.

What is claimed is:

1. A machining device comprising:
a device main body;
a cutting blade (1) for cutting a work piece and (2) rotatably supported by the device main body;
a base configured to support the device main body with respect to the work piece;
a guide member (1) that is configured to guide the cutting blade of the machining device with respect to the work piece and (2) including a connection bar; and
a tool fixing device (1) configured to adjustably fix the guide member to the base and (2) including a rotatable operation member, wherein:
rotation of the operation member in a given direction causes the tool fixing device to exert a motive force on the connection bar to fix a position of the guide member with respect to the base; and
a friction reduction member is disposed between the operation member and the connection bar;
the friction reduction member includes a pressing member that is rotatable with respect to the operation member; and
the pressing member is configured to be brought into contact with the connection bar to press the connection bar.

2. The machining device according to claim 1, wherein the pressing member is rotatably supported by the operation member via a ball bearing.

3. The machining device according to claim 1, wherein the pressing member, the connection bar and the operation member are configured such that friction between the pressing member and the connection bar is larger than friction between the pressing member and the operation member.

4. The machining device according to claim 1, wherein the pressing member is made of synthetic resin.

5. The machining device according to claim 1, wherein the guide member is a long guide ruler adaptor.

6. A machining device including a cutting blade for cutting a work piece and having a longitudinal direction, comprising:
a parallel guide ruler that is attached to the machining device, the parallel guide ruler comprising (a) a flat connection bar (1) extending in a direction perpendicular to the longitudinal direction of the machining device and (2) inserted through orifices facing each other in the left-to-right direction on opposite sides of the device and (b) a ruler main body at one end of the connection bar extending in a plane parallel to the longitudinal axial direction of the machining device, wherein the guide ruler is configured to guide the cutting blade of the machining device with respect to the work piece; and
a ruler-fixing device including a rotatable operation member and a friction reduction member, wherein:
rotation of the operation member causes the operation member to exert a motive force on the connection bar to fix a position of the parallel guide ruler; and
the friction reduction member is disposed between the operation member and the connection bar.

7. The machining device according to claim 6, wherein:
the ruler-fixing device further comprises a fixing screw shaft, a ball bearing, and a nut associated with the operation member;
the fixing screw shaft extends in an up-to-down direction perpendicular to a top surface of the connection bar, and the operation member comprises a flange fixed to an upper head of the fixing screw shaft, protruding radially in the left-to-right direction from the fixing screw shaft, rotatable such that it may rotate the ruler-fixing device generating the motive force, wherein said rotation is stopped by the associated nut;
the friction reduction member comprises a resin piece formed in a circumferential, tubular orientation, with a downward protrusion in the circumferential direction, wherein the motive force generated by the rotation of the operation member may be transferred to the friction reduction member in the downward direction via the ball bearing located in an inner peripheral diameter of the friction reduction member;
when the fixing screw shaft is moved downward via rotation of the operation member, the friction reduction member may move downward with the fixing screw shaft, with the downward motive force being transferred via the ball bearing, and may press the upper surface of the connection bar.

8. The machining device according to claim 7, wherein:
the ruler-fixing device additionally comprises a rubber elastic pin; and
where the elastic rubber pin may be driven into an up-to-down cutout region within the circumferential direction of the friction reduction member, wherein when driven into the region the elastic rubber pin contacts the outer peripheral diameter of the ball bearing and thereby stops rotation of the friction reduction member.

9. The machining device according to claim 8, wherein the friction reduction member is made of synthetic resin with a low coefficient of friction.

10. The machining device according to claim 6, wherein:
the ruler-fixing device further comprises a fixing screw shaft, grease, and a nut associated with the operation member;
wherein the fixing screw shaft extends in an up-to-down direction perpendicular to a top surface of the connection bar, and the operation member comprises a flange fixed to an upper head of the fixing screw shaft, protruding radially in the left-to-right direction from the fixing screw shaft, rotatable such that it may rotate the ruler-fixing device generating the motive force, wherein the rotation is stopped by the associated nut;

wherein the friction reduction member comprises a resin piece formed in a circumferential, tubular orientation, with a downward protrusion, wherein the motive force may be transferred to the friction reduction member in the downward direction via grease serving as a lubricant agent, where the grease is fixatedly located in an inner peripheral diameter of the friction reduction member; and where when the fixing screw shaft is moved downward via rotation of the operation member, the friction reduction member may move downward with the fixing screw shaft, with the downward motive force being transferred via the grease, and may press the upper surface of the connection bar.

11. The machining device according to claim 1, wherein: the guide member is a parallel guide ruler.

12. The machining device according to claim 6, wherein: the ruler-fixing device further comprises a fixing screw shaft, a sliding bearing made of oil impregnated metal, and a nut associated with the operation member;

the fixing screw shaft extends in an up-to-down direction perpendicular to a top surface of the connection bar, and the operation member comprises a flange fixed to an upper head of the fixing screw shaft, protruding radially in the left-to-right direction from the fixing screw shaft, rotatable such that it may rotate the ruler-fixing device generating the motive force, wherein said rotation is stopped by the associated nut;

the friction reduction member comprises a resin piece formed in a circumferential, tubular orientation, with a downward protrusion, wherein the motive force may be transferred to the friction reduction member in the downward direction via the sliding bearing located in an inner peripheral diameter of the friction reduction member;

when the fixing screw shaft is moved downward via rotation of the operation member, the friction reduction member may move downward with the fixing screw shaft, with the downward motive force being transferred via the sliding bearing, and may press the upper surface of the connection bar.

13. The machining device according to claim 5, further comprising:

a long guide ruler including a guide protrusion, wherein:

the long guide ruler adapter includes a guide groove that is configured to complementary fit to receive the guide protrusion of the long guide ruler such that the long guide ruler adapter is slidably engaged with the long guide ruler; and the long guide ruler adapter engaged with the long guide ruler that is placed on the work piece guides the cutting blade of the machining device with respect to the workpiece along the guide protrusion of the long guide ruler.

14. A machining device comprising:

a device main body;

a cutting blade (1) for cutting a work piece and (2) rotatably supported by the device main body;

a base configured to support the device main body with respect to the work piece;

a guide member (1) that is configured to guide the cutting blade of the machining device with respect to the work piece and (2) including a connection bar; and a tool fixing device (1) configured to adjustably fix the guide member to the base and (2) including a rotatable operation member, wherein:

rotation of the operation member in a given direction causes the tool fixing device to exert a motive force on the connection bar to fix a position of the guide member with respect to the base; and a friction reduction member is disposed between the operation member and the connection bar and configured such that only the friction reduction member and the base contact the connection bar.

15. A machining device comprising:

a device main body;

a cutting blade (1) for cutting a work piece and (2) rotatably supported by the device main body;

a base configured to support the device main body with respect to the work piece;

a guide member (1) that is configured to guide the cutting blade of the machining device with respect to the work piece and (2) including a connection bar; and a tool fixing device (1) configured to adjustably fix the guide member to the base and (2) including a rotatable operation member, wherein:

rotation of the operation member in a given direction causes the tool fixing device to exert a motive force on the connection bar to fix a position of the guide member with respect to the base; and a friction reduction member is disposed between the operation member and the connection bar and configured such that the entire friction reduction member is between the operation member and the connection bar.

* * * * *